United States Patent
Tsuboi et al.

(10) Patent No.: US 11,057,851 B2
(45) Date of Patent: Jul. 6, 2021

(54) TERMINAL APPARATUS, COMMUNICATION METHOD, AND INTEGRATED CIRCUIT

(71) Applicants: SHARP KABUSHIKI KAISHA, Sakai (JP); FG INNOVATION COMPANY LIMITED, Tuen Mun (HK)

(72) Inventors: Hidekazu Tsuboi, Sakai (JP); Shoichi Suzuki, Sakai (JP); Shohei Yamada, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/095,914

(22) PCT Filed: Feb. 15, 2017

(86) PCT No.: PCT/JP2017/005471
§ 371 (c)(1),
(2) Date: Oct. 23, 2018

(87) PCT Pub. No.: WO2017/187722
PCT Pub. Date: Nov. 2, 2017

(65) Prior Publication Data
US 2019/0132808 A1   May 2, 2019

(30) Foreign Application Priority Data
Apr. 26, 2016  (JP) .............................. JP2016-087790

(51) Int. Cl.
*H04W 56/00* (2009.01)
*H04W 36/06* (2009.01)
(Continued)

(52) U.S. Cl.
CPC ......... *H04W 56/001* (2013.01); *H04W 36/06* (2013.01); *H04W 76/19* (2018.02); *H04W 76/27* (2018.02); *H04W 36/0079* (2018.08)

(58) Field of Classification Search
CPC .................................................. H04W 56/001
See application file for complete search history.

(56) References Cited

U.S. PATENT DOCUMENTS

| 2004/0106412 | A1* | 6/2004 | Laroia ................ H04W 16/12 455/448 |
| 2005/0124344 | A1* | 6/2005 | Laroia ................ H04W 36/18 455/436 |

(Continued)

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0 (Dec. 2015).
(Continued)

*Primary Examiner* — John D Blanton
(74) *Attorney, Agent, or Firm* — ScienBiziP, P.C.

(57) ABSTRACT

A technology related to a terminal apparatus, a communication method, and an integrated circuit is provided for efficiently monitoring a status of communication. The terminal apparatus communicates with the base station apparatus by switching between a first frequency and a second frequency in a cell, a timer for monitoring a radio link in the cell starts based on consecutively detecting that out of synchronization occurs a prescribed number of times, the timer stops in the case of switching between the first frequency and the second frequency, and any one of the first frequency and the second frequency is a frequency by which the terminal apparatus has established Radio Resource Control connection.

13 Claims, 13 Drawing Sheets

(51) Int. Cl.
*H04W 76/19* (2018.01)
*H04W 76/27* (2018.01)
*H04W 36/00* (2009.01)

(56) References Cited

U.S. PATENT DOCUMENTS

| | | | | |
|---|---|---|---|---|
| 2010/0234037 | A1* | 9/2010 | Terry | H04L 5/003 |
| | | | | 455/450 |
| 2011/0292824 | A1* | 12/2011 | Uemura | H04W 56/00 |
| | | | | 370/252 |
| 2014/0274057 | A1* | 9/2014 | Pavlov | H04W 36/165 |
| | | | | 455/436 |
| 2017/0230780 | A1* | 8/2017 | Chincholi | H04W 24/10 |

OTHER PUBLICATIONS

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0 (Dec. 2015).

"3rd Generation Partnership Project; Technical Specification Group Radio Access Network; Evolved Universal Terrestrial Radio Access (E-UTRA); Physical layer procedures (Release 13)", 3GPP TS 36.213 V13.0.0 (Dec. 2015).

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0 (Dec. 2015).

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0 (Dec. 2015).

QUALCOMM INCORPORATED, "New Work Item: NarrowBand IOT (NB-IOT)", 3GPP TSG RAN Meeting #69, RP-151621, Phoenix, USA, Sep. 14-16, 2015.

"Status Report to TSG", 3GPP TSG RAN meeting #71, RP-160183, Göteborg, Sweden, Mar. 7-10, 2016.

* cited by examiner

TERMINAL APPARATUS, COMMUNICATION METHOD, AND INTEGRATED CIRCUIT

TECHNICAL FIELD

The present invention relates to a terminal apparatus, a communication method, and an integrated circuit.

This application claims priority based on JP 2016-087790 filed on Apr. 26, 2016, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE: registered trademark)", or "Evolved Universal Terrestrial Radio Access (EUTRA)") have been studied (Non Patent Literature 1, 2, 3, 4, and 5). In LTE, a base station apparatus is also referred to as an evolved NodeB (eNodeB), and a terminal apparatus is also referred to as User Equipment (UE). LTE is a cellular communication system in which multiple areas covered by the base station apparatuses are deployed to form a cellular structure. A single base station apparatus may manage multiple cells.

In the 3GPP, standardization of a radio technology using narrowbands has been studied for the Internet of Things, and deployments that use a resource of a normal LTE carrier (in-band), a guard band (guard band), a band that is not used in normal LTE (standalone), and the like have been considered (Non Patent Literature 6). Additionally, it is considered that an anchor PRB that is mainly used for cell connection (for obtaining system information) and a PRB other than the anchor PRB (non-anchor PRB) are allocated to a terminal apparatus to communicate (Non Patent Literature 7).

CITATION LIST

Non Patent Literature

NPL 1: 3GPP TS 36.211 V13.0.0 (2015-12) http://www.3gpp.org/DynaReport/36211.htm
NPL 2: 3GPP TS 36.212 V13.0.0 (2015-12) http://www.3gpp.org/DynaReport/36212.htm
NPL 3: 3GPP TS 36.213 V13.0.0 (2015-12) http://www.3gpp.org/DynaReport/36213.htm
NPL 4: 3GPP TS 36.321 V13.0.0 (2015-12) http://www.3gpp.org/DynaReport/36321.htm
NPL 5: 3GPP TS 36.331 V13.0.0 (2015-12) http://www.3gpp.org/DynaReport/36331.htm
NPL 6: RP-151621 New Work Item: NarrowBand IoT (NB-IoT), Qualcomm incorporated http://www.3gpp.org/ftp/tsg_ran/TSG_RAN/TSGR_69/Docs/RP-151621.zip
NPL 7: RP-160183Status Report to TSG http://www.3gpp.org/ftp/tsg_ran/TSG_RAN/TSGR_71/Docs/RP-160183.zip

SUMMARY OF INVENTION

Solution to Problem

The present invention provides a terminal apparatus capable of efficiently monitoring a status of communication with a base station apparatus, a base station apparatus communicating with the terminal apparatus, a communication method to be used for the terminal apparatus, a communication method to be used for the base station apparatus, an integrated circuit to be mounted on the terminal apparatus, and an integrated circuit to be mounted on the base station apparatus.

(1) In order to accomplish the object described above, an aspect of the present invention is contrived to provide the following means. That is, a first aspect of the present invention is a terminal apparatus for communicating with a base station apparatus via a cell, the terminal apparatus communicating with the base station apparatus by switching between a first frequency and a second frequency different from the first frequency in the cell, in which a timer for monitoring a radio link in the cell is common between the first frequency and the second frequency, the timer starts based on consecutively detecting that out of synchronization (out-of-sync) occurs a prescribed number of times, the timer stops in the case of switching between the first frequency and the second frequency, and any one of the first frequency and the second frequency is a frequency by which the terminal apparatus has established Radio Resource Control (RRC) connection.

(2) In the first aspect of the present invention, in a case that first out of synchronization is detected on the first frequency and second out of synchronization is detected on the second frequency, even in a case that the first out of synchronization and the second out of synchronization consecutively occur, it is regarded that the first out of synchronization and the second out of synchronization do not consecutively occur.

(3) In the first aspect of the present invention, the timer stops based on consecutively detecting in-synchronization (in-sync) a prescribed number of times, and in a case that first in-synchronization is detected on the first frequency and second in-synchronization is detected on the second frequency, even in a case that the first in-synchronization and the second in-synchronization are consecutively detected, it is regarded that the first in-synchronization and the second in-synchronization are not consecutively detected.

(4) In the first aspect of the present invention, it is regarded that the first out of synchronization detected on the first frequency and the second out of synchronization detected on the second frequency consecutively occur.

(5) In the first aspect of the present invention, the timer stops based on consecutively detecting the in-synchronization (in-sync) the prescribed number of times, and it is regarded that the first in-synchronization detected on the first frequency and the second in-synchronization detected on the second frequency are consecutively detected.

(6) A second aspect of the present invention is a terminal apparatus for communicating with a base station apparatus via a cell, the terminal apparatus communicating with the base station apparatus by switching between a third frequency and a fourth frequency different from the third frequency in the cell, in which, in a case of monitoring a radio link in the cell, detection for out of synchronization (out-of-sync) is performed only by any one of the third frequency and the fourth frequency, and any one of the third frequency and the fourth frequency is a frequency by which the terminal apparatus has established Radio Resource Control (RRC) connection.

(7) In the second aspect of the present invention, a timer for monitoring the radio link in the cell starts based on consecutively detecting that the out of synchronization occurs a prescribed number of times on the third frequency, and the timer stops in a case of switching from the third frequency to the fourth frequency.

(8) In the second aspect of the present invention, the timer for monitoring the radio link in the cell starts based on consecutively detecting that the out of synchronization occurs the prescribed number of times on the third frequency, the timer suspends detection for the out of synchronization in a case of switching from the third frequency to the fourth frequency, and the timer suspends detection for the out of synchronization in a case of switching from the third frequency to the fourth frequency and resumes the detection for the out of synchronization in a case of returning from the fourth frequency to the third frequency.

(9) In the second aspect of the present invention, it is regarded that the out of synchronization detected immediately before the suspension and out of synchronization detected immediately after the resumption are consecutively detected.

(10) A third aspect of the present invention is a communication method to be applied to a terminal apparatus for communicating with a base station apparatus via a cell, the communication method including at least a step of communicating with the base station apparatus by switching between a first frequency and a second frequency different from the first frequency in the cell, in which a timer for monitoring a radio link in the cell is common between the first frequency and the second frequency, the timer starts based on consecutively detecting that out of synchronization (out-of-sync) occurs a prescribed number of times, the timer stops in the case of switching between the first frequency and the second frequency, and any one of the first frequency and the second frequency is a frequency by which the terminal apparatus has established Radio Resource Control (RRC) connection.

(11) A fourth aspect of the present invention is an integrated circuit to be mounted on a terminal apparatus for communicating with a base station apparatus via a cell, the integrated circuit allowing the terminal apparatus to perform a function of communicating with the base station apparatus by switching between a first frequency by which the terminal apparatus establishes Radio Resource Control (RRC) connection and a second frequency different from the first frequency in the cell, in which a timer for monitoring a radio link in the cell is common between the first frequency and the second frequency, the timer starts based on consecutively detecting that out of synchronization (out-of-sync) occurs a prescribed number of times, the timer stops in the case of switching between the first frequency and the second frequency, and any one of the first frequency and the second frequency is a frequency by which the terminal apparatus has established the Radio Resource Control (RRC) connection.

(12) A fifth aspect of the present invention is a communication method to be applied to a terminal apparatus for communicating with a base station apparatus via a cell, the communication method including at least a step of communicating with the base station apparatus by switching between a third frequency and a fourth frequency different from the third frequency in the cell, in which, in a case of monitoring a radio link in the cell, detection for out of synchronization (out-of-sync) is performed only by any one of the third frequency and the fourth frequency, and any one of the third frequency and the fourth frequency is a frequency by which the terminal apparatus has established Radio Resource Control (RRC) connection.

(13) A sixth aspect of the present invention is an integrated circuit to be mounted on a terminal apparatus for communicating with a base station apparatus via a cell, the integrated circuit allowing the terminal apparatus to perform a function of communicating with the base station apparatus by switching between a third frequency and a fourth frequency different from the third frequency in the cell, in which, in a case of monitoring a radio link in the cell, detection for out of synchronization (out-of-sync) is performed only by any one of the third frequency and the fourth frequency, and any one of the third frequency and the fourth frequency is a frequency by which the terminal apparatus has established Radio Resource Control (RRC) connection.

Advantageous Effects of Invention

According to the present invention, the terminal apparatus is capable of efficiently monitoring a status of communication with the base station apparatus.

DESCRIPTION OF EMBODIMENT

An embodiment of the present invention will be described below.

A radio communication system according to the present embodiment will be described.

Long Term Evolution (LTE) (registered trademark) and the Narrow Band Internet of Things (NB-IoT) may be defined as different Radio Access Technologies (RAT). The NB-IoT may be defined as a technology included in LTE. The present embodiment may be applied to the NB-IoT, but may be applied to LTE or other RATs.

Figure 1:
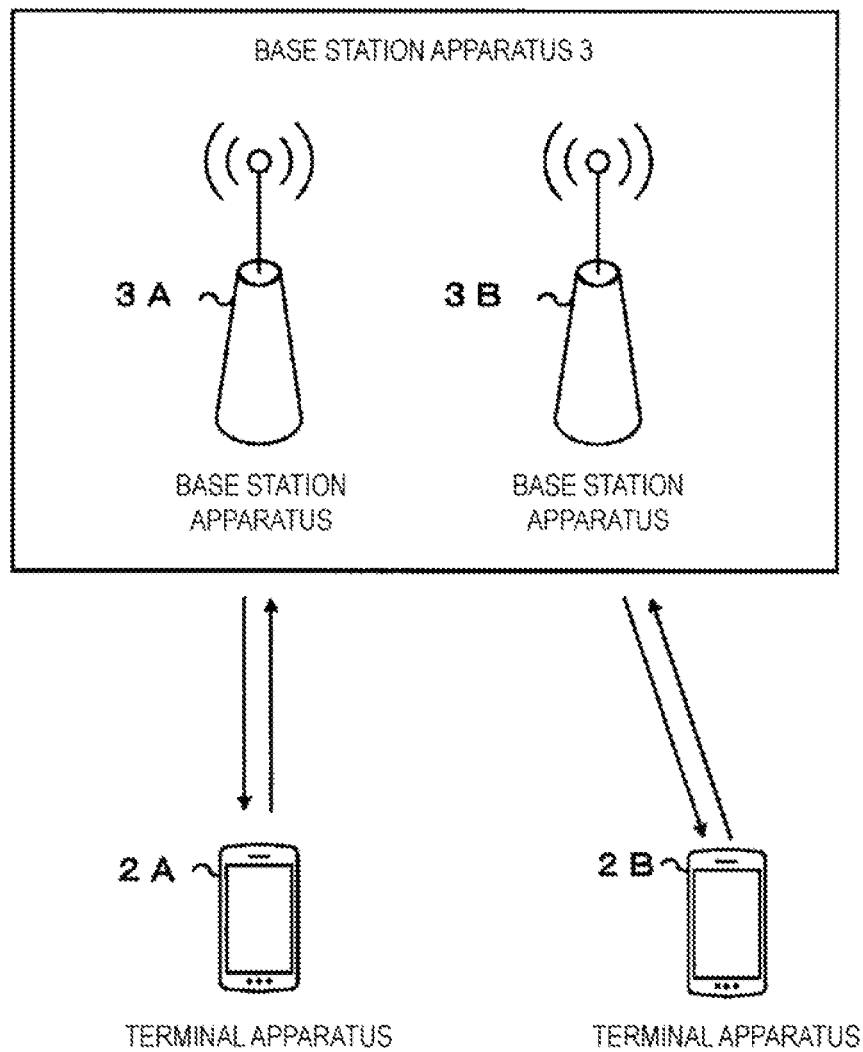
FIG. 1 is a conceptual diagram of a radio communication system according to the present embodiment.

FIG. 1 is a conceptual diagram of the radio communication system according to the present embodiment. In FIG. 1, the radio communication system includes terminal apparatuses 2A and 2B and base station apparatuses 3A and 3B. The terminal apparatuses 2A and 2B are also referred to as a terminal apparatus 2. A base station apparatus 3 includes the base station apparatuses 3A and 3B. The base station apparatuses 3A and 3B may be defined as different apparatuses. The base station apparatus 3 may include a core network apparatus.

The terminal apparatus 2A and the base station apparatus 3A communicate with each other by using the NB-IoT. The terminal apparatus 2B and the base station apparatus 3B communicate with each other by using the NB-IoT.

Time Division Duplex (TDD) and/or Frequency Division Duplex (FDD) is applied to the radio communication system in the present embodiment. In the present embodiment, a single serving cell is configured for the terminal apparatus 2. The serving cell configured for the terminal apparatus 2 is also referred to as an NB-IoT cell.

The configured single serving cell may be a primary cell. The primary cell is a serving cell in which an initial connection establishment procedure has been performed, a serving cell in which a connection re-establishment procedure has been started, or a cell indicated as a primary cell during a handover procedure.

A carrier corresponding to a serving cell in a downlink is referred to as a downlink component carrier. A carrier corresponding to the serving cell in an uplink is referred to as an uplink component carrier. The downlink component carrier and the uplink component carrier are collectively referred to as a component carrier.

The present embodiment may be applied to three scenarios/modes of standalone, guard band, and in-band. In the standalone mode, a channel bandwidth of the NB-IoT cell is not included in a channel bandwidth of a LTE cell. In the guard band mode, the channel bandwidth of the NB-IoT cell is included in a guard band of the LTE cell. In the in-band mode, the channel bandwidth of the NB-IoT cell is included in a transmission bandwidth of the LTE cell. For example, the guard band of the LTE cell is included in the channel bandwidth of the LTE cell, but is not included in the transmission bandwidth of the LTE cell. The present embodiment is applicable to any of the modes.

Physical channels and physical signals in the present embodiment will be described.

In FIG. 1, the following downlink physical channels are used for downlink radio communication from the base station apparatus 3 to the terminal apparatus 2. The downlink physical channels are used by a physical layer for transmission of information output from a higher layer.

Narrowband Physical Broadcast CHannel (NPBCH)
Narrowband Physical Downlink Control CHannel (NPDCCH)
Narrowband Physical Downlink Shared CHannel (NPDSCH)

The NPBCH is used to broadcast system information that is commonly used by the terminal apparatuses 2.

The NPDCCH is used to transmit Narrow Band Downlink Control Information (DCI) that is used for scheduling of the NPDSCH and downlink control information that is used for scheduling of the Narrowband Physical Uplink Shared CHannel (NPUSCH), The downlink control information may include HARQ information.

Cyclic Redundancy Check (CRC) parity bits to be attached to the downlink control information are scrambled with a Cell-Radio Network Temporary Identifier (C-RNTI), a Temporary C-RNTI, or a Semi Persistent Scheduling (SPS) C-RNTI. The C-RNTI and the SPS C-RNTI are identifiers for identifying a terminal apparatus within a cell. The Temporary C-RNTI is used during the contention based random access procedure. Adding the RNTI to the downlink control information is also referred to as the RNTI being included in the NPDCCH.

The C-RNTI is used to control the NPDSCH or the NPUSCH in one subframe. The SPS C-RNTI is used to periodically allocate a resource for the NPDSCH or the NPUSCH. The Temporary C-RNTI is used to schedule retransmission of a random access message 3 and transmission of a random access message 4.

The NPDSCH is used for transmission of downlink data (DownLink Shared CHannel (DL-SCH)).

In FIG. 1, the following downlink physical signals are used for the downlink radio communication from the base station apparatus 3 to the terminal apparatus 2. The downlink physical signals are not used for transmission of information output from the higher layer, but are used by the physical layer.

Narrowband Synchronization signal (NSS)
Narrowband Downlink Reference Signal (NDL-RS)

The NSS is used in order for the terminal apparatus 2 to establish synchronization in terms of frequency and time in the downlink of the NB-IoT cell. The NSS includes a Narrowband Primary Synchronization Signal (NPSS) and a Narrowband Secondary synchronization Signal (NSSS). The NSSS is generated based on a Narrowband Physical layer Cell Identity (NPCI) of the NB-IoT cell. The terminal apparatus 2 may obtain the NPCI of the NB-IoT cell from the NSS.

The NDL-RS is used in order for the terminal apparatus 2 to perform channel compensation on the downlink physical channel in the NB-IoT cell. The NDL-RS may be used in order for the terminal apparatus 2 to calculate downlink channel state information in the NB-IoT cell.

Additionally, in a case of the in-hand mode NB-IoT, a LTE cell-specific downlink reference signal (LTE-Cell specific Reference Signal (LTE-CRS)) may be used to perform the channel compensation on the downlink physical channel in the NB-IoT cell. In addition, the LTE-CRS may be used in order for the terminal apparatus 2 to calculate the downlink channel state information in the NB-IoT cell.

In FIG. 1, the following uplink physical channels are used for uplink radio communication from the terminal apparatus 2 to the base station apparatus 3. The uplink physical channels are used by a physical layer for transmission of information output from a higher layer.

Narrowband Physical Random Access Channel (NPRACH)
Narrowband Physical Uplink Shared CHannel (NPUSCH)

The NPUSCH may be used for transmission of uplink data (Uplink-Shared CHannel (UL-SCH)) and/or uplink control information. The uplink control information includes a Hybrid Automatic Repeat reQuest ACKnowledgment (HARQ-ACK) corresponding to the NPDSCH (downlink data). In the present embodiment, transmitting the NPUSCH once corresponds to one or multiple subcarriers. For example, the number of the subcarriers for transmitting the NPUSCH once is selected from 1, 3, 6, or 12. Transmission of a different NPUSCH may correspond to a different subcarrier. The transmission of the different NPUSCH may correspond to the different number of subcarriers.

In FIG. 1, the following uplink physical signal is used for the uplink radio communication from the terminal apparatus 2 to the base station apparatus 3. The uplink physical signal is not used for transmission of information output from the higher layer, but is used by the physical layer.

Narrowband Downlink Reference Signal (NUL-RS)

The NUL-RS may be used in order for the base station apparatus 3 to perform channel compensation of the uplink physical channel in the NB-IoT cell. The NUL-RS may be used in order for the terminal apparatus 2 to calculate the uplink channel state information in the NB-IoT cell. The NUL-RS may be mapped to a subcarrier identical to the corresponding NPUSCH. The NUL-RS is time-multiplexed with the NPUSCH. The NUL-RS is also referred to as a DeModulation Reference Signal (DMRS), an uplink reference signal, or a reference signal.

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The DL-SCH is a transport channel. A channel used in a Medium Access Control (MAC) layer is referred to as a transport channel. A unit of the transport channel used in the MAC layer is also referred to as a Transport Block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to coding processing on a codeword-by-codeword basis.

The base station apparatus 3 and the terminal apparatus 2 exchange (transmit and/or receive) a signal in the higher layer. For example, the base station apparatus 3 and the terminal apparatus 2 may transmit and/or receive, in a Radio Resource Control (RRC) layer, RRC signaling (also referred to as a Radio Resource Control message (RRC message) or Radio Resource Control information (RRC information)). Furthermore, the base station apparatus 3 and the terminal apparatus 2 may transmit and/or receive, in the Medium Access Control (MAC) layer, a MAC Control Element (CE), Here, the RRC signaling and/or the MAC CE is also referred to as higher layer signaling.

The NPDSCH is used to transmit the RRC signaling and the MAC CE. Here, the RRC signaling transmitted from the base station apparatus 3 by using the NPDSCH may be signaling common to multiple terminal apparatuses 2 in a cell. The RRC signaling transmitted from the base station apparatus 3 by using the NPDSCH may be signaling dedicated (specified) to a certain terminal apparatus 2 (also referred to as dedicated signaling or UE specific signaling). A cell-specific parameter may be transmitted by using the signaling common to the multiple terminal apparatuses 2 in the cell or the signaling dedicated to the certain terminal apparatus 2. A UE-specific parameter may be transmitted by using the signaling dedicated to the certain terminal apparatus 2.

The physical channels (NPDCCH, NPDSCH, and NPUSCH) corresponding to identical data (a transport block) may be repeatedly transmitted in consecutive subframes. A Repetition Level (RL) of the physical channel may be controlled for each physical channel. The repetition level 1 means that the physical channel corresponding to the identical data is not repeatedly transmitted. The repetition level larger than 1 means that the physical channel corresponding to the identical data is repeatedly transmitted. That is, the repetition level is associated with a length of one transmission instance/attempt/bundle of the physical channel in a time domain.

The repetition level may be at least based on some or all of the downlink control information, the RRC signalling, the MAC CE, and a coverage level. The coverage level includes at least a first coverage level and a second coverage level. The coverage level may include three or more coverage levels.

The coverage level is associated with the repetition level. The terminal apparatus 2 for which the first coverage level is configured may transmit and/or receive the physical channel having the repetition level which is X or smaller. The terminal apparatus 2 for which the first coverage level is configured may not transmit and/or receive the physical channel having the repetition level which is larger than X. The terminal apparatus 2 for which the second coverage level is configured may transmit and/or receive the physical channel having the repetition level which is larger than X. For example, X may be 1 or 3.

The terminal apparatus 2 may configure the coverage level based on information received from the base station apparatus 3 and Reference Signal Received Power (RSRP) of the signal (NDL-RS) received from the base station apparatus 3. Here, the above information may be the downlink control information, the RRC signalling or the MAC CE.

A radio network according to the present embodiment will be described.

A communicable range (communication area) at each frequency controlled by a base station apparatus 3 is regarded as a cell. Here, the communication area covered by the base station apparatus 3 may be different in size and shape for each frequency. Moreover, the covered area may be different for each frequency. A radio network, in which cells having different types of base station apparatuses 3 and different cell radii coexist in an area by using the identical frequency or different frequencies to form a single communication system, is referred to as a heterogeneous network.

The terminal apparatus 2 operates by regarding the inside of a cell as a communication area. In a case that the terminal apparatus 2 moves from one cell to another cell, the terminal apparatus 2 moves to an appropriate different cell through a cell re-selection procedure at the time of having no radio connection (also referred to as an idle state, or an RRC_IDLE state) and through a handover procedure at the time of having radio connection (also referred a connected state, or an RRC_CONNECTED state). The appropriate cell in general indicates a cell that is determined that access from the terminal apparatus 2 is not prohibited based on information specified by the base station apparatus 3, and that has downlink reception quality satisfying a predefined condition.

The base station apparatus 3 manages a cell that is an area where the terminal apparatus 2 is capable of communicating, for each frequency. A single base station apparatus 3 may manage multiple cells.

In a case that the terminal apparatus 2 can communicate with a certain base station apparatus 3, the cell configured so as to be used for the communication with the terminal apparatus 2 is referred to as a "Serving cell", while the other cells that are not used for the communication are referred to as "Neighboring cells", among the cells of the base station apparatus 3.

A structure of a radio protocol according to the present embodiment will be described.

Figure 4:
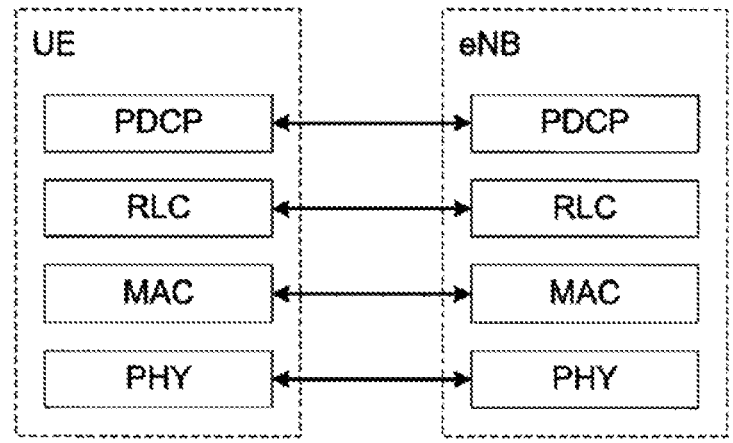
FIG. 4 is a diagram illustrating a protocol stack of a User-plane or U-Plane (UP) according to the embodiment of the present invention.

FIG. 4 is a diagram illustrating a protocol stack of a User-Plane or U-Plane (UP) handling user data of the terminal apparatus 2 and the base station apparatus 3, in a radio network (EUTRAN) of EUTRA. In addition, FIG. 5 is a diagram illustrating a protocol stack of a Control-Plane or C-Plane (CP) handling control data.

Figure 5:
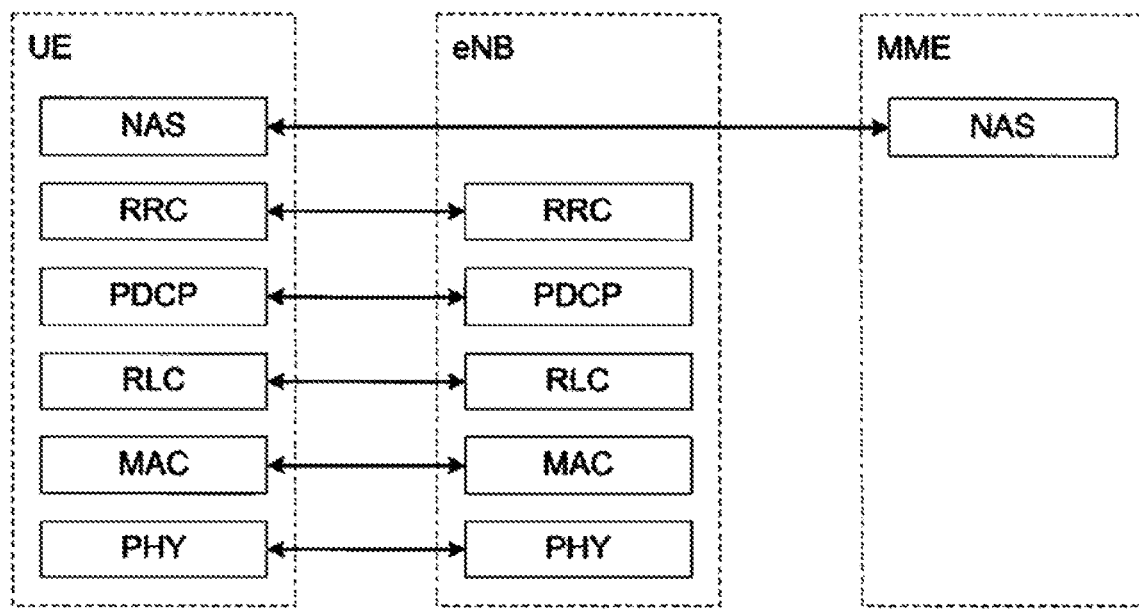
FIG. 5 is a diagram illustrating a protocol stack of a Control-plane or C-Plane (CP) according to the embodiment of the present invention.

In FIGS. 4 and 5, a PHYsical layer (PHY layer) uses the physical channels to provide a transmission service to a higher layer. The PHY layer is connected with a Medium Access Control layer (MAC layer), which is a higher layer, via the transport channels. The data is exchanged via the transport channels between layers, that is, the MAC layer and the PHY layer. The data is transmitted and/or received via the physical channels between the PHY layers of the terminal apparatus 2 and the base station apparatus 3.

The MAC layer maps various logical channels to the various transport channels. The MAC layer is connected with a Radio Link Control layer (RLC layer), which is a higher layer, via the logical channels. The logical channels are roughly classified depending on the type of the transmitted information, specifically, classified into the control channels transmitting the control information and the traffic channels transmitting the user information. The MAC layer has a function to control the PHY layer in order to perform Discontinuous Reception and Transmission (DRX and DTX), a function to perform the random access procedure, a function to report transmit power information, a function to perform the HARQ control, and the like.

The RLC layer performs segmentation or concatenation of the data received from the higher layer to adjust its data size so that a lower layer can appropriately transmit the data. The RLC layer also has a function to guarantee Quality of Service (QoS) demanded by each data. In other words, the RLC layer has a function of data re-transmission control or the like.

A Packet Data Convergence Protocol layer (PDCP layer) has a header compression function to compress unnecessary control information in order to efficiently transmit an IP packet, which is the user data, in a radio segment. The PDCP layer also has a data encryption function.

A Radio Resource Control layer (RRC layer) is present in the Control-Plane protocol stack. The RRC layer performs configurations and reconfigurations of Radio Bearers (RBs) to control the logical channels, the transport channels, and the physical channels. RBs are classified into a Signaling Radio Bearer (SRB) and a Data Radio Bearer (DRB), and the SRB is used as a path for transmitting an RRC message, which is the control information. The DRB is used as a path for transmitting the user data. Each RB is configured between the RRC layers of the base station apparatus 3 and the terminal apparatus 2.

The PHY layer corresponds to a physical layer as the first layer in the layered structure of the generally known Open Systems Interconnection (OSI) model. The MAC layer, the RLC layer, and the PDCP layer correspond to a data link layer as the second layer in the OSI model. The RRC layer corresponds to a network layer as the third layer in the OSI model.

Signalling protocols used between the network and the terminal apparatus 2 are divided into an Access Stratum (AS) protocol and a Non-Access Stratum (NAS) protocol.

For example, the protocol in the RRC layer and its lower layers is the Access Stratum protocol used between the terminal apparatus 2 and the base station apparatus 3. Further, the protocol in Connection Management (CM), Mobility Management (MM), or the like of the terminal apparatus 2 is the Non-Access Stratum protocol, and is used between the terminal apparatus 2 and a Core Network (CN). For example, as illustrated in FIG. 5, communication using the Non-Access Stratum protocol is transparently performed via the base station apparatus 3 between the terminal apparatus 2 and a Mobility Management Entity (MME).

An anchor PRB and a non-anchor PRB according to the present embodiment will be described.

An NB-IoT cell includes multiple PRBs (or channels or carriers) in a frequency direction, the NPSS, the NSSS, the NPBCH and other system information of the multiple PRBs are transmitted, and the PRB used by the terminal apparatus 2 for establishing RRC connection is referred to as the anchor PRB (or anchor channel, anchor carrier).

Additionally, the PRB (channel, carrier) by which some or all of the NPSS, the NSSS, and the NPBCH are not transmitted is referred to as the non-anchor PRB (or non-anchor channel, non-anchor carrier).

The terminal apparatus 2 that has established the RRC connection by using the anchor PRB may continue to communicate by changing the anchor PRB to the non-anchor PRB, based on an RRC connection reconfiguration message indicated from the base station apparatus 3 (for example, physical configuration message for the NB-IoT (PhysicalConfigDedicated-NB)), or other notifications. For example, the terminal apparatus 2, in a case that information on a frequency (carrier) of the PRB (non-anchor PRB) to be used for transmission and/or reception in the future is indicated, may promptly start to use the indicated frequency, after transmitting an acknowledgement in response to reception of the last transport block in a case that the MAC layer transports one RRC message.

Moreover, in a case that there exist the multiple PRBs by which the NPSS, the NSSS, the NPBCH, and other system information are transmitted, the terminal apparatus 2 may configure the PRB, by which the RRC connection has been established, as the anchor PRB, and may configure the other PRB, by which the NPSS, the NSSS, the NPBCH, and other system information are transmitted, as the non-anchor PRB.

The random access procedure described later may be performed only by the anchor PRB. In this case, the terminal apparatus 2 that is in communication by the non-anchor PRB returns from the non-anchor PRB to the anchor PRB to perform the random access procedure, in a case that the random access procedure is indicated by the base station apparatus 3 (PDCCH order) or other conditions for performing the random access procedure are satisfied.

Radio Link Monitoring (RLM) according to the present embodiment will described.

An example of an operation that the terminal apparatus 2 having e RRC connection detects a radio link failure will be described.

The terminal apparatus 2 obtains information such as a value (t310) of a timer (T310) for detecting physical layer problems of a serving cell (the anchor PRB and/or the non-anchor PRB), a threshold value N310 of the number of times detecting out-of-sync, and a threshold value N311 of the number of times detecting in-sync via broadcast information or the RRC message for each user from a serving base station apparatus 3. In addition, the value of the timer and the threshold value of the number of times may be configured to default values. Moreover, the timer may be common between the anchor PRB and the non-anchor PRB, or may be independent. Furthermore, the value of the timer and the threshold value of the number of times may be configured to a common value between the anchor PRB and the non-anchor PRB, or may be configured to independent values.

In order to monitor the radio link, a physical layer processing unit of the terminal apparatus 2, based on information such as reception power of the received reference signal (NDL-RS and/or LTE-CRS) and/or NSS (NPSS and/or NSSS), in a case that it is estimated that radio link quality of the serving cell has been a specified threshold value (Qout) or smaller over a specified period (for example, TEvaluate_Qout=200 ms), notifies a processing unit of a Radio Resource Control (RRC) layer, which is the higher layer, of "out-of-sync". Additionally, the physical layer processing unit, based on the information such as the reception power of the received reference signal, in a case that it is estimated that the radio link quality of the serving cell has been a specified threshold value (Qin) or larger over a specified period (for example, TEvaluate_Qin=100 ms), notifies the processing unit of the Radio Resource Control layer, which is the higher layer, of "in-sync". Note that the physical layer processing unit may notify the higher layer of out-of-sync or in-sync after a specified interval (for example, TReport_sync=10 ms) or longer.

In addition, the terminal apparatus 2 may be notified of information on a signal that may be assumed to be transmitted by using the non-anchor PRB via the RRC message or other signalling from the base station apparatus 3. For example, in a case that the NPSS is transmitted by using only the anchor PRB, and in a case that the non-anchor PRB for a certain terminal apparatus 2 is the anchor PRB for another terminal apparatus 2, the reception power can be measured by using the NPSS even in a case of the non-anchor PRB. Alternatively, for example, in a case that a transmission period of the NPSS and/or the NSSS by using the non-anchor PRB is a subset of a transmission period by using the anchor PRB, and in a case that the non-anchor PRB for a certain terminal apparatus 2 is the anchor PRB for another terminal apparatus 2, the reception power can be measured based on the transmission period of the NPSS and/or the NSSS by using the anchor PRB even in a case of the non-anchor PRB. Therefore, the terminal 2 may be allowed to obtain some or all pieces of the following information (A) to (F) from the base station apparatus 3.

(A) Information indicating whether the LTE-CRS is transmitted by using the non-anchor PRB or not (B) Information indicating whether the NPSS is transmitted by using the non-anchor PRB or not (C) Information indicating whether the NSSS is transmitted by using the non-anchor PRB or not (D) Resource information on the NPSS and/or the NSSS that is transmitted by using the non-anchor PRB (E) Information indicating whether an identical type of signal to the anchor PRB (for example, the LTE-CRS, and/or the NPSS and/or the NSSS) is transmitted by using the non-anchor PRB or not (F) Information indicating whether transmission power of the NSS and/or the NDL-RS that is transmitted by using the non-anchor PRB is identical to that of the anchor PRB or not Here, for example, the threshold value (Qout) may be defined as a level at which reception in a radio link of the downlink is not reliable and a hypothetical transmission block error rate for the downlink control channel (NPDCCH) based on a predetermined parameter becomes 10%. Additionally, for example, the threshold value (Qin) may be defined as a level at which radio link quality of the downlink is significantly high, the reception is reliable compared with the condition at Qout and a hypothetical transmission block error rate for the downlink control channel based on a predetermined parameter becomes 2%. Moreover, in a case that the threshold value Qout and the threshold value Qin are defined, different formats for the NPDCCH may be assumed.

More specifically, the threshold value Qout may be defined as a level at which the block error rate for the NPDCCH, considered some or all of the following conditions (A) to (D), becomes a predetermined rate.

(A) The DCI format for the NPDCCH is made to be a specified format.

(B) The repetition number of times for the NPDCCH is made to be a specified number of times (for example, a maximum repetition number of times (Rmax) for the PDCCH, which is indicated via the RRC message).

(C) Which reference signal is used for demodulation (for example, the NPDCCH is demodulated by using the NDL-RS and the LIE-CRS in a case a cell identity for LTE and a cell identity for the NB-IoT are identical in the in-band, and in a case that the LTE-CRS and the NDL-RS have the identical number of antennas and a port number is one or two in the in-band, or the NPDCCH is demodulated by using only the NDL-RS in a case of not being in the in-band, in a case that the cell identity for LIE and the cell identity for the NB-IoT are different in the in-band, in a case that the LTE-CRS and the NDL-RS have the different numbers of antennas in the in-band, and in a case that the LTE-CRS and the NDL-RS have the identical number of antennas but the port number is not one or two in the in-band).

(D) A transmission power ratio between the NPDCCH and the reference signal (the NDL-RS and/or the LTE-CRS) (for example, a condition is configured by whether the NDL-RS for the anchor PRB is boosted or not, the antenna port number for the LTE-CRS in a case that the LTE-CRS is used, or the like).

In addition, the threshold value Qin may be defined as a level at which the block error rate for the NPDCCH, considered some or all of the following conditions (A) to (D), becomes a predetermined rate.

(A) The DCI format for the NPDCCH is made to be a specified format.

(B) The repetition number of times for the NPDCCH is made to be a specified number of times (for example, which may be made to be a maximum repetition number of times (Rmax) for the PDCCH which is indicated via the RRC message, or a value smaller than Rmax).

(C) Which reference signal is used for demodulation (for example, only the NDL-RS is used to demodulate the NPDCCH, or the like).

(D) A transmission power ratio between the NPDCCH and the reference signal (the NDL-RS and/or the LTE-CRS) (for example, a condition is that the anchor PRB is not boosted, and/or the LTE-CRS is not used, or the like).

The NSS (the NPSS and/or the NSSS) is transmitted by using the anchor PRB. The base station apparatus 3 may transmit information for indicating whether the NSS (the NPSS and/or the NSSS) is transmitted by using the non-anchor PRB or not to the terminal apparatus 2. The NSS (the NPSS and/or the NSSS) may be used for monitoring the radio link using the anchor PRB. The NSS (the NPSS and/or the NSSS) may be used for monitoring the radio link on the non-anchor PRB, in a case the NSS (the NPSS and/or the NSSS) is transmitted by using the non-anchor PRB.

In a case the NSS (the NPSS and/or the NSSS) is used for monitoring the radio link, the base station apparatus 3 may transmit power ratio information for indicating (i) a power ratio between the reference signal (the NDL-RS and/or the LTE-CRS) and the NSS (the NPSS and/or the NSSS), and/or (ii) a power ratio between the NPDCCH and the NSS (the NPSS and/or the NSSS), to the terminal apparatus 2. In a case that the terminal apparatus 3 has not received the above power ratio information, the terminal apparatus 3 may regard that the power of the reference signal (the NDL-RS and/or the LTE-CRS) and the power of the NSS (the NPSS and/or the NSSS) are identical. In a case that the terminal apparatus 3 has not received the above power ratio information, the terminal apparatus 3 may regard that the power of the NPDCCH and the power of the NSS (the NPSS and/or the NSSS) are identical. The above power may be power per one resource element.

Additionally, the physical layer processing unit of the terminal apparatus 2 may notify the higher layer of only out-of-sync or in-sync, which occurs on the anchor PRB, may notify the higher layer of only out-of-sync or in-sync, which occurs on the non-anchor PRB, and may notify the higher layer of out-of-sync or in-sync, which occurs during reception in a cell (that is, a cell in which either the anchor PRB or the non-anchor PRB is received). In a case that the physical layer processing unit notifies the higher layer of out-of-sync or in-sync, which occurs during reception in a cell, the physical layer processing unit may notify the higher layer of information capable of determining in which of the cells using the anchor PRB or the non-anchor PRB out-of-sync or in-sync occurs.

In a case that a radio resource control layer processing unit of the terminal apparatus 2 consecutively receives out-of-sync that is notified from the physical layer processing unit the predetermined number of times (N310), the radio resource control layer processing unit may allow the timer (T310) to start or restart counting. Additionally, in a case that the radio resource layer processing unit of the terminal apparatus 2 consecutively receives in-sync the predetermined number of times (N311), the radio resource layer processing unit may allow the timer (T310) to stop counting. Furthermore, in a case that the timer (T310) expires without stopping of counting, the radio resource control layer processing unit of the terminal apparatus 2 may shift to an idle mode or perform an RRC connection re-establishment procedure. For example, operations of the terminal apparatus 2 may be different depending on a state of establishing AS security. First, in a case that the AS security has not been established, the terminal apparatus 2 shifts to an RRC_IDLE mode, and in a case that the AS security has been established, the terminal apparatus 2 performs the RRC connection re-establishment procedure.

Although the above is an example of a case that the DRX is not configured in the terminal apparatus 2, in a case that the DRX is configured in the terminal apparatus 2, the radio resource control layer processing unit of the terminal apparatus 2 may configure for the physical layer processing unit so that a period for measuring the radio link quality and an interval of notification to the higher layer have different values from those of a case that the DRX is not configured. Note that even in a case that the DRX is configured, while the above timer (T310) is counting, the period for measuring the radio link quality to estimate in-sync and the interval of notification to the higher layer have identical values to those of the case that the DRX is not configured.

Note that some or all of the timer value (t310), the threshold values (Qin, Qout), the numbers of times (N310, N311), the periods (TEvaluate_Qout, TEvaluate_Qin), or the interval (TReport_sync) may be independent values between the anchor PRB and the non-anchor PRB. Some or all of the timer value (t310), the threshold values (Qin, Qout), the numbers of times (N310, N311), the periods (TEvaluate_Qout, TEvaluate_Qin), or the interval (TReport_sync) may be broadcasted as system information from the base station apparatus 3, may be individually configured for the terminal apparatus 2 via the RRC message or the like, or may be a combination of them.

Radio Link Monitoring (RLM) according to the present embodiment will be described in more detail.

Figure 8:
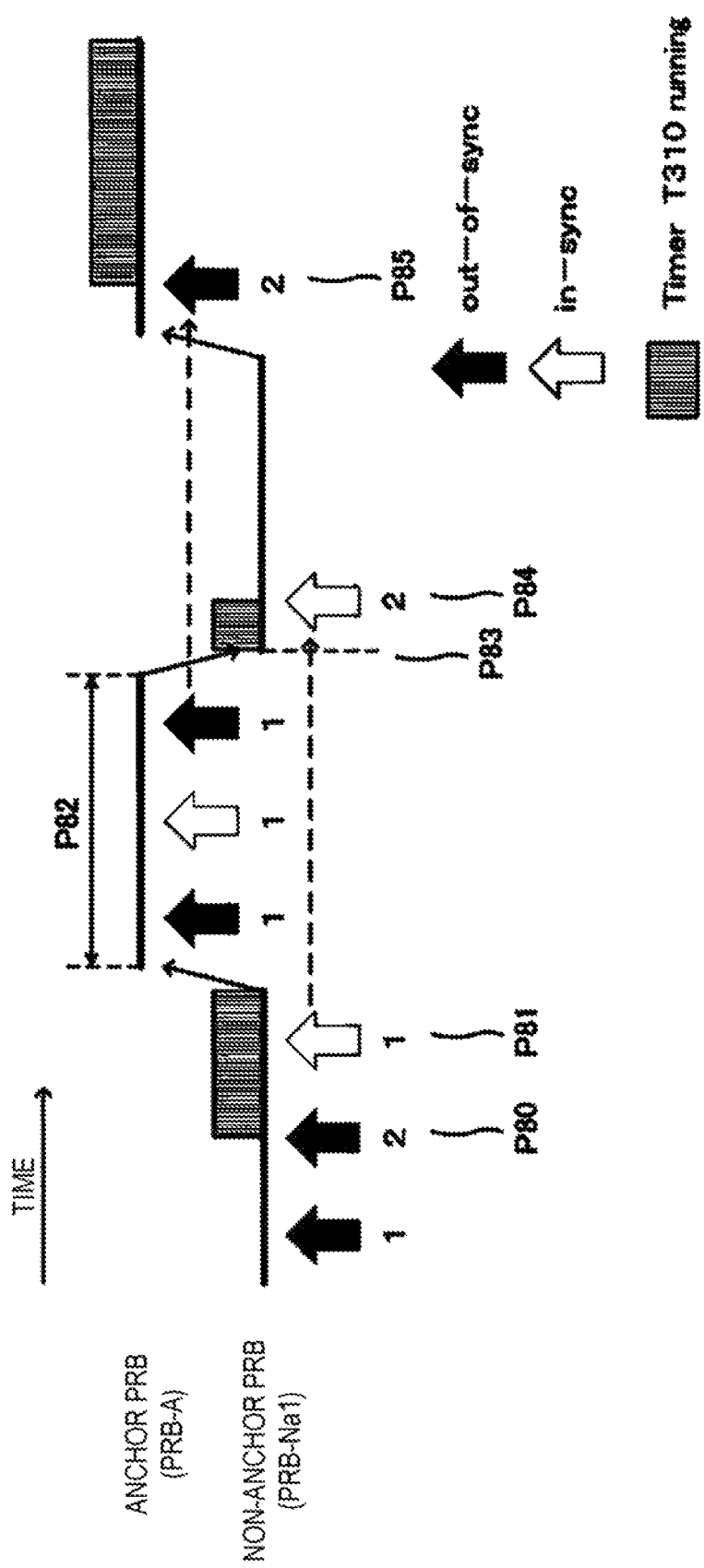
FIG. 8 is a diagram illustrating an example of monitoring a radio link according to the embodiment of the present invention.
Figure 9:
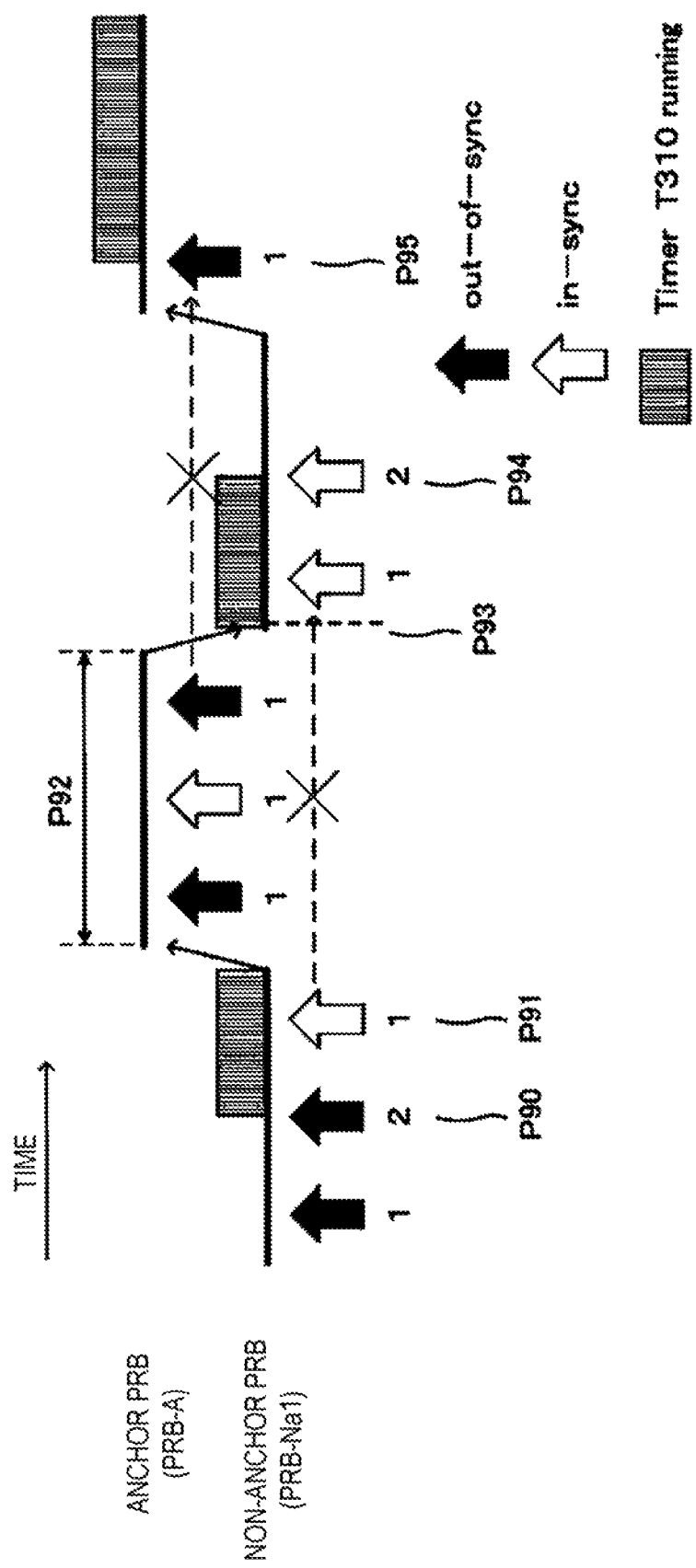
FIG. 9 is a diagram illustrating another example of monitoring a radio link according to the embodiment of the present invention.
Figure 10:
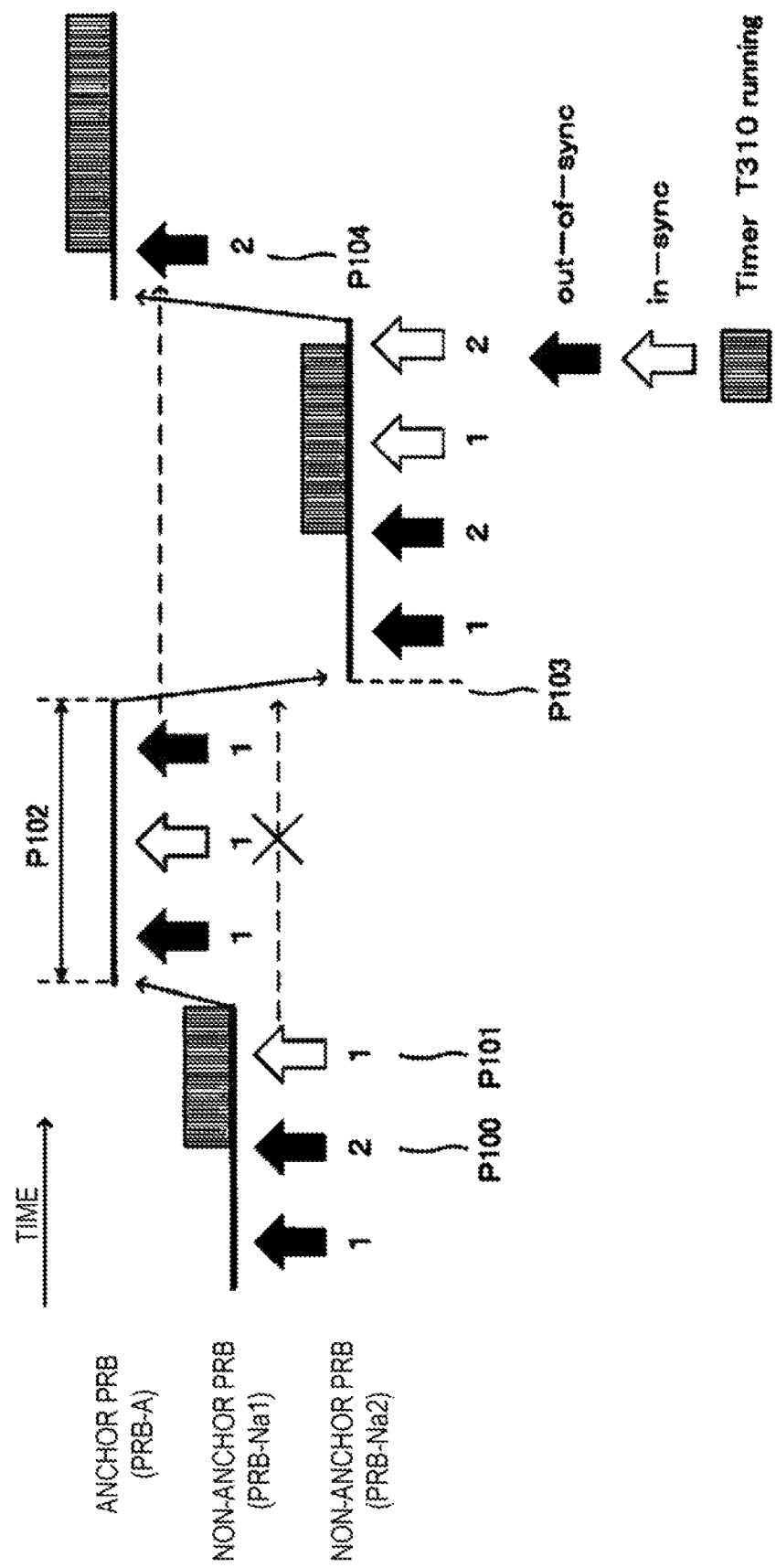
FIG. 10 is a diagram illustrating another example of monitoring a radio link according to the embodiment of the present invention.

First, an example that the independent timers between the anchor PRB and the non-anchor PRB are used will be described using FIGS. 8 to 10. Where, N310=2, and N311=2 for the anchor PRB and the non-anchor PRB. In FIGS. 8 to 10, horizontal axes indicate time.

At P80 in FIG. 8, based on a case that the terminal apparatus 2 receiving by the non-anchor PRB (PRB-Na1) consecutively detects N310 out-of-sync twice (N310=2), the timer T310 starts. Then, at P81, in-sync is detected once. After that, because of indication for performing the random access procedure from the base station apparatus 3 or other reasons, the terminal apparatus 2 shifts to the anchor PRB (PRB-A). At this time, T310 for PRB-Na1 is suspended, and counted time and count numbers of times of out-of-sync and in-sync are retained.

At P82 on the anchor PRB (PRB-A), out-of-sync and in-sync are newly counted, and in a case that out-of-sync is consecutively detected twice (N310=2), a timer, which is independent of the suspended timer for the non-anchor PRB, starts. Additionally, in a case that in-sync is consecutively detected twice (N311=2), the timer T310 for the anchor PRB stops.

In a case that the terminal apparatus 2 returns to the non-anchor PRB (PRB-Na1) at P83, the suspended timer T310 resumes. In this example, since the timer T310 suspends in a state that in-sync has been detected once at P81, it is regarded that in-sync is consecutively detected twice (N311=2) based on a case in-sync is detected on the non-anchor PRB at P84 again, so that the timer T310 for the non-anchor PRB stops.

Furthermore, in a case that the terminal apparatus 2 returns to the anchor PRB (PRB-A), since the timer T310 suspends in a state that out-of-sync has been detected once at P82, it is regarded that out-of-sync is consecutively detected twice (N310=2) based on a case out-of-sync is detected on the anchor PRB at P85 again, so that the timer T310 for the anchor PRB starts.

That is, even in a case that out-of-syn or in-sync is detected on the anchor PRB (PRB-A) between P81 and P84, it is regarded that detection at P81 and detection at P84 are consecutive.

As another example, at P90 in FIG. 9, based on a case that the terminal apparatus 2 receiving by the non-anchor PRB (PRB-Na1) consecutively detects N310 out-of-sync twice (N310=2), the timer T310 starts. Then, in-sync is detected once at P91. After that, because of indication for performing the random access procedure from the base station apparatus 3 or other reasons, the terminal apparatus 2 shifts to the anchor PRB (PRB-A). At this time, T310 for PRB-Na1 is suspended, and counted time is retained and the count numbers of times of out-of-sync and in-sync are reset.

At P92 on the anchor PRB (PRB-A), out-of-sync and in-sync are newly counted, and in a case that out-of-sync is consecutively detected twice (N310=2), a timer, which is independent from the suspended timer for the non-anchor PRB, starts. Additionally, in a case that in-sync is consecutively detected twice (N311=2), the timer T310 for the anchor PRB stops.

In a case that the terminal apparatus 2 returns to the non-anchor PRB (PRB-Na1) at P93, the suspended timer T310 resumes. In this example, since a state that in-sync has been detected once at P91 is reset because of suspension, in a case that in-sync is consecutively detected twice (N311=2) on the non-anchor PRB at P94, the timer T310 for the non-anchor PRB stops.

Furthermore, in a case that the terminal apparatus 2 returns to the anchor PRB (PRB-A), the count number of times of out-of-sync on the anchor PRB is reset, so that, in a case that out-of-sync is detected on the anchor PRB at P95, the detection of out-of-sync is regarded as the first time.

As another example, at P100 in FIG. 10, based on a case that the terminal apparatus 2 receiving by the non-anchor PRB (PRB-Na1) consecutively detects out-of-sync twice (N310=2), the timer T310 starts. Then, in-sync is detected once at P101. After that, because of indication for performing the random access procedure from the base station apparatus 3 or other reasons, the terminal apparatus 2 shifts to the anchor PRB (PRB-A). At this time, T310 for PRB-Na1 is suspended, and counted time and count numbers of times of out-of-sync and in-sync are retained.

At P102 on the anchor PRB (PRB-A), out-of-sync and in-sync are newly counted, and in a case that out-of-sync is consecutively detected twice (N310=2), a timer, which is independent from the suspended timer for the non-anchor PRB, starts. Additionally, in a case that in-sync is consecutively detected twice (N311=2), the timer T310 for the anchor PRB stops.

In a case that the terminal apparatus 2 shifts to the non-anchor PRB (PRB-Na2) different from the non-anchor PRB (PRB-Na1) at P103, the suspended timer T310 stops and the count numbers of times of out-of-sync and in-sync are reset. That is, in a case that the terminal apparatus 2 shifts to the non-anchor PRB (PRB-Na2) different from the non-anchor PRB (PRB-Na1) before shifting to the anchor PRB, the timer T310 and the count number of times for the non-anchor PRB are reset.

Furthermore, in a case that the terminal apparatus 2 returns to the anchor PRB (PRB-A), since the timer T310 and the count number of times for the anchor PRB are not reset and the timer T310 suspends in a state that out-of-sync has been detected once at P102, it is regarded that out-of-sync is consecutively detected twice (N310=2) in a case out-of-sync is detected on the anchor PRB at P104, so that the timer T310 for the anchor PRB starts.

In above example, in a case that the timer T310 for the anchor PRB or the non-anchor PRB expires, the terminal apparatus 2 may shift to an idle mode or perform an RRC connection re-establishment procedure. Alternatively, in a case that the timer T310 for the non-anchor PRB expires, the terminal apparatus 2 may report as non-anchor PRB failure by the anchor PRB to the base station apparatus 3 via an RRC message, and in a case that the timer T310 for the anchor PRB expires, the terminal apparatus 2 may shift to the idle mode or perform the RRC connection re-establishment procedure. Moreover, which of the procedures is performed may be selected in response to an object of shifting to the anchor PRB. For example, a scheduling request by the terminal apparatus 2, indication for performing the random access procedure from the base station apparatus 3, and the like are given as the object of shifting.

In addition, in order to identify out-of-sync and in-sync on the anchor PRB and the non-anchor PRB, information indicating whether out-of sync and in-sync are a state of the anchor PRB or a state of the non-anchor PRB may be indicated from the physical layer processing unit to the higher layer, and the higher layer (for example, the radio resource control layer processing unit) may determine whether out-of sync and in-sync indicated from the physical layer processing unit are the state of the anchor PRB or the state of the non-anchor PRB.

Next, an example that one timer is used for the anchor PRB and the non-anchor PRB will be described using FIGS. 11 to 14. Where, N310=2, and N311=2.

Figure 11:
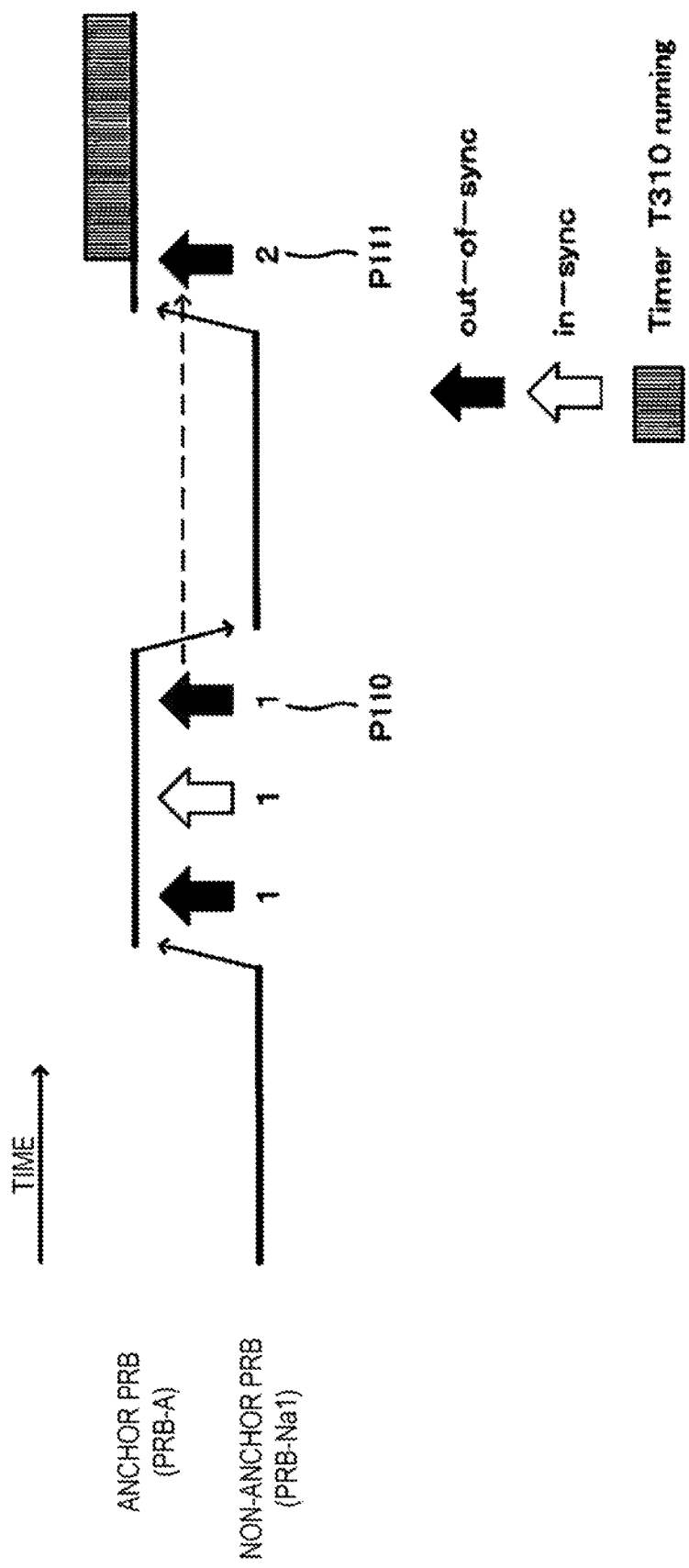
FIG. 11 is a diagram illustrating another example of monitoring a radio link according to the embodiment of the present invention.

In FIG. 11, the terminal apparatus 2 receiving by the non-anchor PRB (PRB-Na1) does not count in terms of out-of-sync and in-sync. Alternatively, the terminal apparatus 2 does not trigger a start of the timer T310 by counting. After that, because of indication for performing the random access procedure from the base station apparatus 3 or other reasons, the terminal apparatus 2 shifts to the anchor PRB (PRB-A).

For the anchor PRB (PRB-A), out-of-sync and in-sync are counted, and in a case that out-of-sync is consecutively detected twice (N310=2), the timer T310 starts. Additionally, in a case that in-sync is consecutively detected twice (N311=2), the timer T310 stops.

In a case that the terminal apparatus 2 returns to the non-anchor PRB (PRB-Na1), the terminal apparatus 2 does not count in terms of out-of-sync and in-sync on the non-anchor PRB (PRB-A). Alternatively, the terminal apparatus 2 does not trigger a start of the timer T310 by counting.

Furthermore, in a case that the terminal apparatus 2 returns to the anchor PRB (PRB-A), since the timer T310 suspends in a state that out-of-sync has been detected once at P110, it is regarded that out-of-sync is consecutively detected twice (N310=2) in a case out-of-sync is detected on the anchor PRB at P111, so that the timer T310 for the anchor PRB starts.

Figure 12:
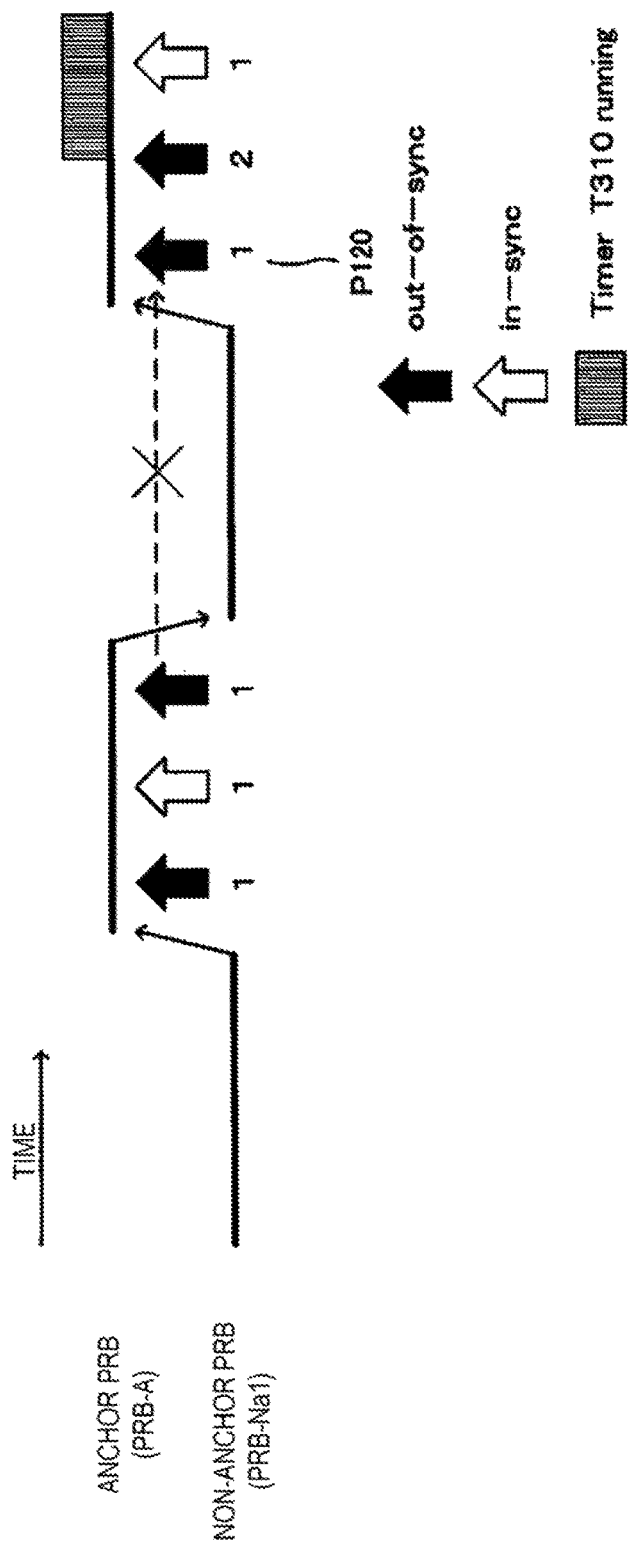
FIG. 12 is a diagram illustrating another example of monitoring a radio link according to the embodiment of the present invention.

As another example, in FIG. 12, the terminal apparatus 2 receiving by the non-anchor PRB (PRB-Na1) does not count in terms of out-of-sync and in-sync. Alternatively, the terminal apparatus 2 does not trigger a start of the timer T310 by counting. After that, because of indication for performing the random access procedure from the base station apparatus 3 or other reasons, the terminal apparatus 2 shifts to the anchor PRB (PRB-A).

For the anchor PRB (PRB-A), out-of-sync and in-sync are counted, and in a case that out-of-sync is consecutively detected twice (N310=2), the timer T310 starts. Additionally, in a case that in-sync is consecutively detected twice (N311=2) the timer T310 stops.

In a case that the terminal apparatus 2 returns to the non-anchor PRB (PRB-Na1), the terminal apparatus 2 does not count in terms of out-of-sync and in-sync on the non-anchor PRB (PRB-A). Alternatively, the terminal apparatus 2 does not trigger a start of the timer T310 by counting.

Furthermore, in a case that the terminal apparatus 2 returns to the anchor PRB (PRB-A), the timer T310 and the count numbers of times of out-of-sync and in-sync on the anchor PRB are reset, so that, in a case that out-of-sync is detected on the anchor PRB at P120 again, the detection of out-of-sync is regarded as the first time.

Figure 13:
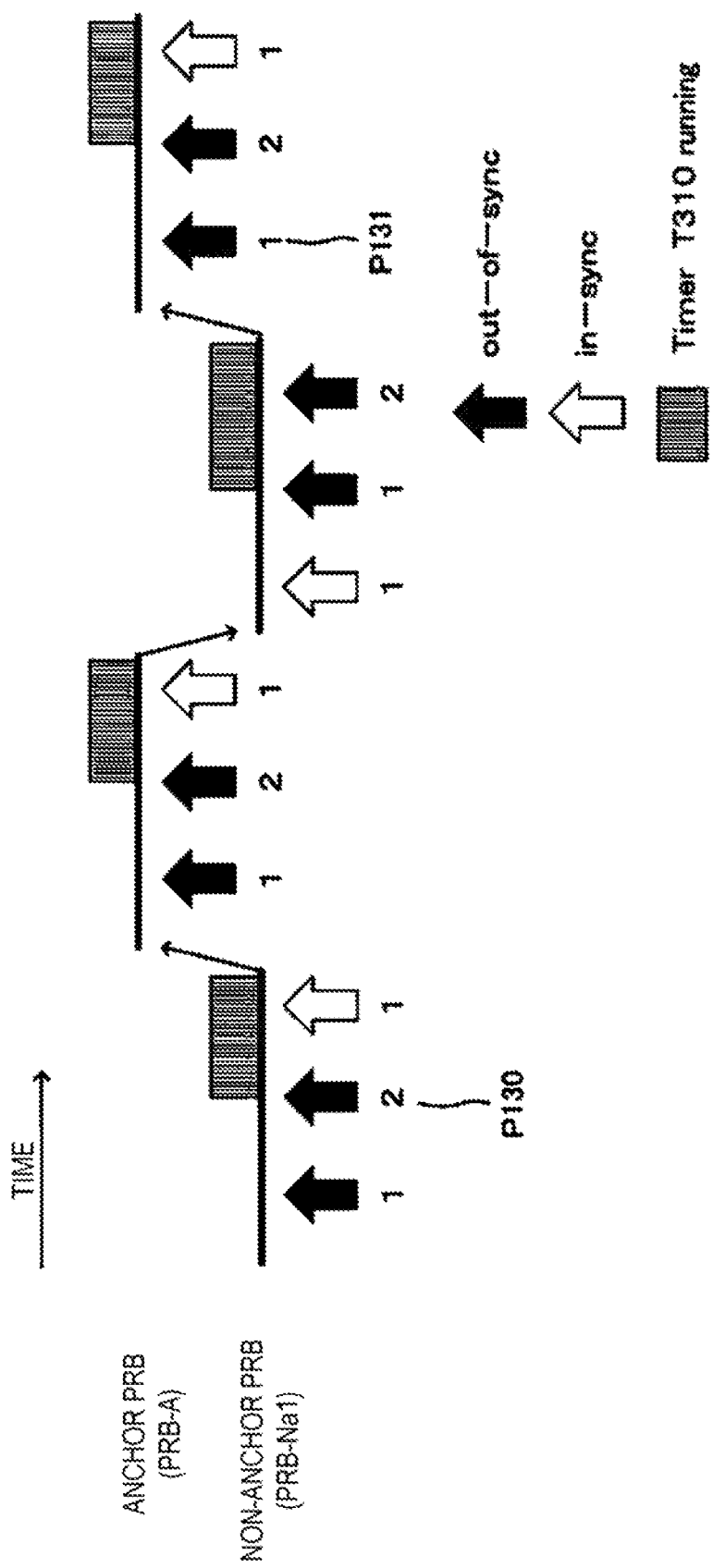
FIG. 13 is a diagram illustrating another example of monitoring a radio link according to the embodiment of the present invention.

As another example, in FIG. 13, in a case that the terminal apparatus 2 receiving by the non-anchor PRB (PRB-Na1) consecutively detects out-of-sync twice (N310=2) at P130, the timer T310 starts. Then, in-sync is detected once. After that, because of indication for performing the random access procedure from the base station apparatus 3 or other reasons, the terminal apparatus 2 shifts to the anchor PRB (PRB-A).

At this time, the counted time of the timer T310 and the count numbers of times of out-of-sync and in-sync are reset.

For the anchor PRB (PRB-A), out-of-sync and in-sync are newly counted, and in a case that out-of-sync is consecutively detected twice (N310=2), the timer T310 starts.

In a case that the terminal apparatus 2 returns from the anchor PRB to the non-anchor PRB (PRB-Na1), the counted time of the timer T310 and the count numbers of times of out-of-sync and in-sync are reset. In other words, in a case that the terminal apparatus 2 shifts between the anchor PRB and the non-anchor PRB or between the non-anchor PRBs, the timer T310 and the count numbers of times of out-of-sync and in-sync are reset.

Furthermore, in a case that the terminal apparatus 2 returns to the anchor PRB (PRB-A), the timer and the count number of times of the anchor PRB are reset, so that, in a case that out-of-sync is detected on the anchor PRB at P131 again, the detection of out-of-sync is regarded as the first time.

Additionally, in the above description, an example that the timer and the count number of times are reset in a case of the shift between the non-anchor PRB (PRB-Na1) and the anchor-PRB (PRB-A) was given, but is not limited to this. Even in a case that out-of-sync or in-sync is consecutively detected across different PRBs, it may be regarded as inconsecutive.

Figure 14:
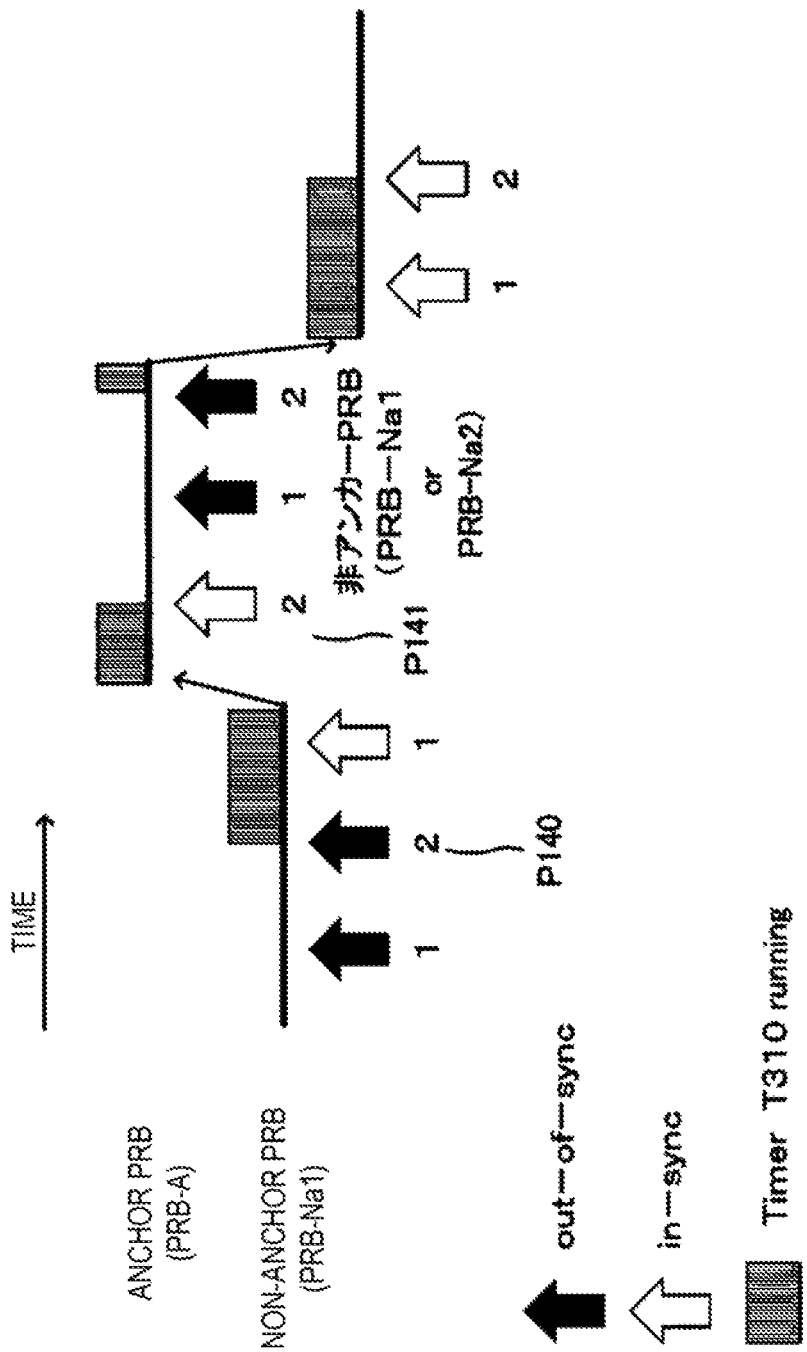
FIG. 14 is a diagram illustrating another example of monitoring a radio link according to the embodiment of the present invention.

As another example, in FIG. 14, based on a case that the terminal apparatus 2 receiving by the non-anchor PRB (PRB-Na1) consecutively detects out-of-sync twice (N310=2) at P140, the timer T310 starts. Then, in-sync is detected once. After that, because of indication for performing the random access procedure from the base station apparatus 3 or other reasons, the terminal apparatus 2 shifts to the anchor PRB (PRB-A). At this time, the counted time of the timer T310 and the count numbers of times of out-of-sync and in-sync are retained.

For the anchor PRB (PRB-A), the timer T310, and out-of-sync and in-sync continue to be counted. Therefore, based on a case that in-sync is consecutively detected twice (N311=2) at P141, the timer T310 stops.

In a case that the terminal apparatus 2 shifts to the non-anchor PRB (PRB-Na1) or the non-anchor PRB (PRB-Na2) different from the non-anchor PRB (PRB-Na1), the count of the timer T310 and the count numbers of times of out-of-sync and in-sync are retained, and the count of the timer T310, and the count numbers of times of out-of-sync and in-sync are continued to be counted on the non-anchor PRB, which is destination of the shift.

In the above example, if necessary, in order to identify out-of-sync and in-sync on the anchor PRB and the non-anchor PRB, information indicating whether out-of sync and in-sync are a state of the anchor PRB or a state of the non-anchor PRB may be indicated from the physical layer processing unit to the higher layer, or the higher layer (for example, the radio resource control layer processing unit) may determine whether out-of sync and in-sync indicated from the physical layer processing unit are the state of the anchor PRB or the state of the non-anchor PRB.

Additionally, the terminal apparatus 2 may switch between starting or restarting and resuming the count of the timer T310, based on a condition. In addition, the terminal apparatus 2 may switch between stopping and suspending the count of the timer T310, based on a condition. Moreover, the terminal apparatus 2 may switch between resetting and keeping the count numbers of times of N310 and/or N311, based on a condition. The above condition may be, for example, some or all of the following conditions (A) to (E).

(A) Whether it is a mode in which a Data Radio Bearer (DRB) and/or an S1-U bearer is established or not (Whether it is the mode in which uplink data piggybacked with an NAS layer message is transmitted or not) (B) A configuration associated with the switching broadcasted from the base station apparatus 3 (C) A configuration associated with the switching individually indicated from the base station apparatus 3 to the terminal apparatus 2 (D) Whether it is a case in which a scheduling request by a mobile station device 2 causes the shift to the anchor PRB or not (E) Whether it is a case in which the shift to the anchor PRB is to perform the random access procedure indicated by the base station apparatus 3 or not.

Additionally, in description for FIGS. 10 and 11, although an example that out-of-sync and in-sync are not counted on the non-anchor PRB is described, on the other hand, out-of-sync and in-sync may be counted on the non-anchor PRB and may be not counted on the anchor PRB. In addition, only in a case that a specified condition causes the shift to the anchor PRB, out-of sync and in-sync may not be counted on the anchor PRB. The specified condition may be, for example, some or all of the following conditions (A) to (C).

(A) Whether it is a mode in which a Data Radio Bearer (DRB) and/or an S1-U bearer is established or not (Whether it is the mode in which uplink data piggybacked with an NAS layer message is transmitted or not) (B) Whether it is a case in which a scheduling request by the mobile station device 2 causes the shift to the anchor PRB or not (C) Whether it is a case in which the shift to the anchor PRB is to perform the random access procedure indicated by the base station apparatus 3 or not.

Moreover, in order to enable an operation that does not count out-of-sync and in-sync, out-of-sync and in-sync may be indicated from a radio transmission and/or reception unit 20 to a radio resource control layer processing unit 26 and may be prevented from being counted by the radio resource control layer processing unit 26, may be prevented from out-of-sync and in-sync being indicated to the radio resource control layer processing unit 26 from the radio transmission and/or reception unit 20, and may not be measured of out-of-sync and in-sync by the radio transmission and/or reception unit 20.

An RRC connection re-establishment according to the present embodiment will be described.

The terminal apparatus 2, for example, in a case that the terminal apparatus 2 cannot follow some or all of configurations included in the RRC connection reconfiguration message indicated from the base station apparatus 3 and security in the AS layer is activated, in a case that radio link failure occurs ((1) in a case that the timer T310, which starts counting in a case that a problem is detected in the physical layer, expires, (2) in a case that the timer T312, which is configured during measurement and starts counting in a case that a measurement report is triggered while the timer T310 is being counted), expires, (3) in a case that a random access problem is indicated from a MAC layer, and in a case that all of the timer T300, which starts counting in a case that an RRC connection request message is transmitted, the timer T301, which starts counting in a case that an RRC connection re-establishment request message is transmitted, the timer T304, which starts counting in a case that an RRC connection reconfiguration message including mobility control information is received, and the timer T311, which starts counting in a case that an RRC connection re-establishment procedure starts, are not being counted, (4) in a case that a fact that the retransmission number of times reaches a maximum value is indicated from an RLC layer, (5) as for a connection maintenance type handover, in a case that radio link failure occurs in a source cell in a case that the handover to a target cell fails, or the like) and the security in the AS layer is activated, and in a case that the handover fails, in order to maintain a connected mode (radio resource control connection), performs the RRC connection re-establishment procedure.

The RRC connection re-establishment succeeds only in a case that (the base station apparatus 3 in) a cell attempted to connect is ready (has a valid context for the terminal apparatus 2). Note that the base station apparatus 3 that does not have the context for the terminal apparatus 2 can obtain the valid context from the base station apparatus 3 that has the context for the stated terminal apparatus 2 to succeed the RRC connection re-establishment.

As the RRC connection re-establishment procedure, the terminal apparatus 2, in a case that the timer T310 and the timer 312 are being counted, first stops counting each of the timers and starts counting the timer T311. Next, radio bearers other than SRB0 are suspended. After that, the MAC layer is reset, default configurations are applied to the MAC layer and the physical layer, and a cell selection procedure is started.

In a case the optimum cell is selected by the RRC connection re-establishment procedure, the terminal apparatus 2 stops the timer T311, starts counting the timer T301, and transmits a connection re-establishment request message to the base station apparatus 3 in the selected cell. The connection re-establishment request message includes information indicating a cause of the RRC connection re-establishment (reconfiguration failure, handover failure, other causes, or the like).

For example, the connection re-establishment request message may include some or all of the following pieces of information (A) and (B).

(A) Frequency information on the anchor PRB and/or the non-anchor PRB by which the terminal apparatus 2 has been connected before failure (B) Frequency information on one PRB, on which the radio link failure occurs, of the anchor PRB and/or the non-anchor PRB by which the terminal apparatus 2 has been connected before failure The terminal apparatus 2 that has transmitted the RRC connection re-establishment request message, in a case of receiving the RRC connection re-establishment message from the base station apparatus 3, stops counting the timer T301 and re-establishes the PDCP and RLC for the SRB1. Furthermore, the terminal apparatus 2 configures a radio resource, and resumes the suspended SRB1. Additionally, the terminal apparatus 2, by using the configuration before the RRC connection re-establishment, performs concealing (integrity) and ciphering, and in a case that processing is normally completed, indicates an RRC re-establishment complete message to the base station apparatus 3.

In a case the optimum cell is not selected by the RRC connection re-establishment procedure, the timer T311 expires, the RRC connection fails, and the terminal apparatus 2 shifts from the connected mode to the idle mode. In addition, in a case that the timer T301 expires or the selected optimum cell becomes not optimum for the reason that the selected optimum cell does not satisfy cell selection criteria, the RRC connection fails, so that the terminal apparatus 2 shifts from the connected mode to the idle mode.

Note that the terminal apparatus 2, in a case that the radio link failure is detected on the non-anchor PRB (or a case that is regarded as the radio link failure on the non-anchor PRB is detected), may not perform the RRC connection re-establishment but indicate the non-anchor PRB failure by using the anchor PRB. The message indicating the non-anchor PRB failure may include the frequency information on the non-anchor PRB.

Moreover, the RRC connection re-establishment procedure has been described in the above description. In the NB-IoT, mechanisms that the RRC connection is suspended in a state that the terminal apparatus 2 and the base station apparatus 3 have configurations during the RRC connection, and the RRC connection is resumed by paging from a network (reception of paging) or a data transmission request from the terminal apparatus 2 regarded as a trigger, have been studied. This RRC connection resume request message may include the frequency information on the non-anchor PRB.

A random access procedure according to the present embodiment will be described below.

The random access procedure includes two access procedures of a contention based random access procedure and a non-contention based random access procedure.

The contention based random access procedure is a random access procedure where a collision possibly occurs between the terminal apparatuses 2, and is performed by a scheduling request or the like at an initial access from a state of not connecting (communicating) with the base station apparatus 3, or in a case that the uplink data transmission occurs in the terminal apparatus 2 connecting with the base station apparatus 3 but being out of uplink synchronization.

The non-contention based random access procedure is a random access procedure where a collision does not occur between the terminal apparatuses 2, and the terminal apparatus 2 is instructed by the base station apparatus 3 to start the random access procedure in a special case, such as a handover for quickly obtaining the uplink synchronization between the terminal apparatus 2 and the base station apparatus 3 in a case that the base station apparatus 3 and the terminal apparatus 2 are out of the uplink synchronization even though the base station apparatus 3 and the terminal apparatus 2 are connected to each other, or invalid transmission timing of the terminal apparatus 2. The non-contention based random access procedure is instructed through a Radio Resource Control (RRC) layer (Layer 3) message and control data of a physical downlink control channel.

Figure 6:
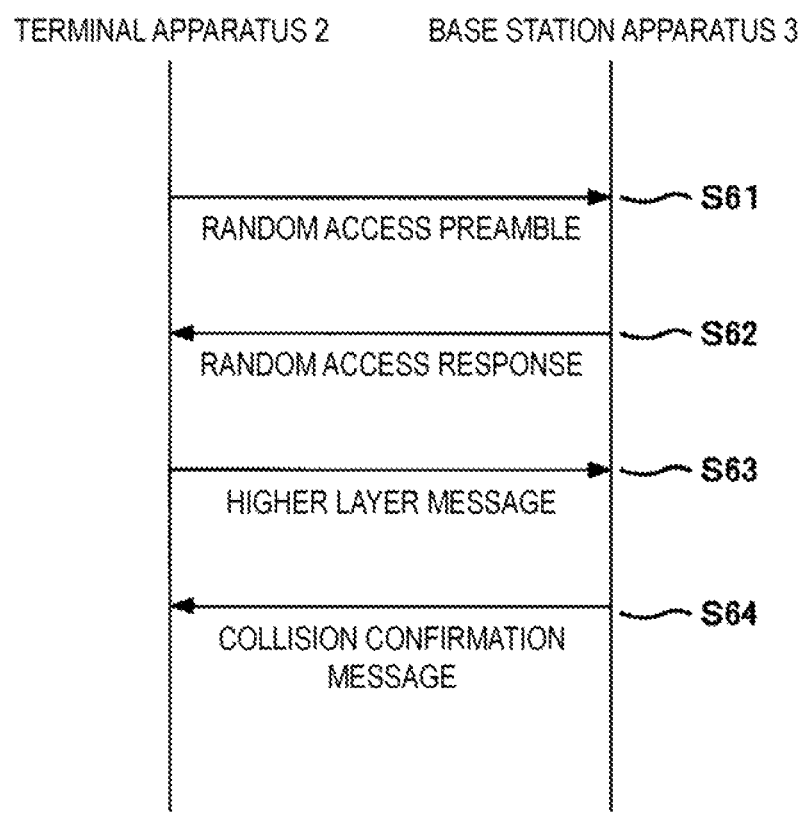
FIG. 6 is a diagram illustrating an example of a sequence chart relating to a contention based random access procedure according to the embodiment of the present invention.

The contention based random access procedure will be simply described by using FIG. 6. First, the terminal apparatus 2 transmits a random access preamble to the base station apparatus 3 (message 1: (1), step S61). Then, the base station apparatus 3 that has received the random access preamble transmits a response (random access response) with respect to the random access preamble to the terminal apparatus 2 (message 2: (2), step S62). The terminal apparatus 2 transmits a message of a higher layer (layer 2/layer 3) based on scheduling information included in the random access response (message 3: (3), step S63). The base station apparatus 3 transmits a collision confirmation message to the terminal apparatus 2 that has been able to receive the message (3) of the higher layer (message 4: (4), step S64). Note that the contention based random access is also referred to as random preamble transmission.

Figure 7:
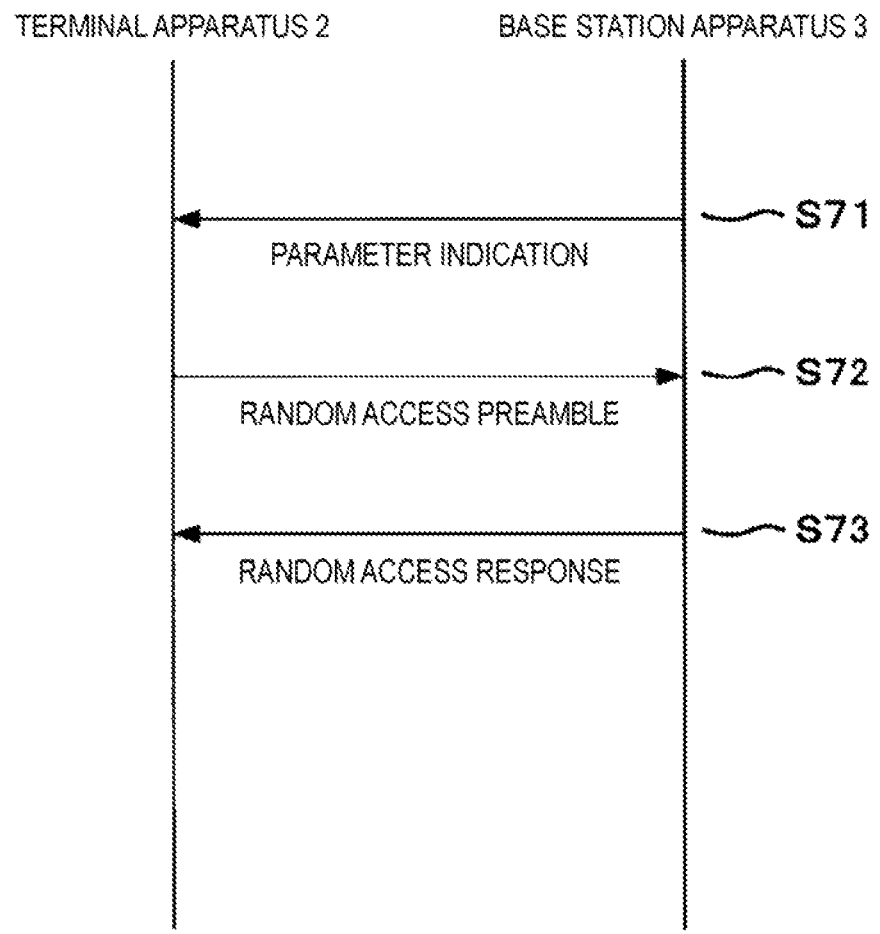
FIG. 7 is a diagram illustrating an example of a sequence chart relating to a non-contention based random access procedure according to the embodiment of the present invention.

Next, the non-contention based random access procedure will be simply described by using FIG. 7. First, the base station apparatus 3 notifies the terminal apparatus 2 of a preamble number (or a sequence number) and of a random access channel number to be used (message 0: (1)', step S71). The terminal apparatus 2 transmits a random access preamble of the specified preamble number to the specified Random Access CHannel (RACH) (message 1: (2)', step S72). Then, the base station apparatus 3 that has received the random access preamble transmits a response (random access response) with respect to the random access preamble to the terminal apparatus 2 (message 2: (3)', step S73). However, in a case that a value of the notified preamble number is zero, the contention based random access procedure is performed. Note that the non-contention based random access procedure is also referred to as dedicated preamble transmission.

Note that in the random access procedure described above, in a case that the terminal apparatus 2 is communicating by using the non-anchor PRB, the terminal apparatus 2 may transmit the message 1 after shifting to the anchor PRB.

Structures of apparatuses according to the present embodiment will be described below.

Figure 2:
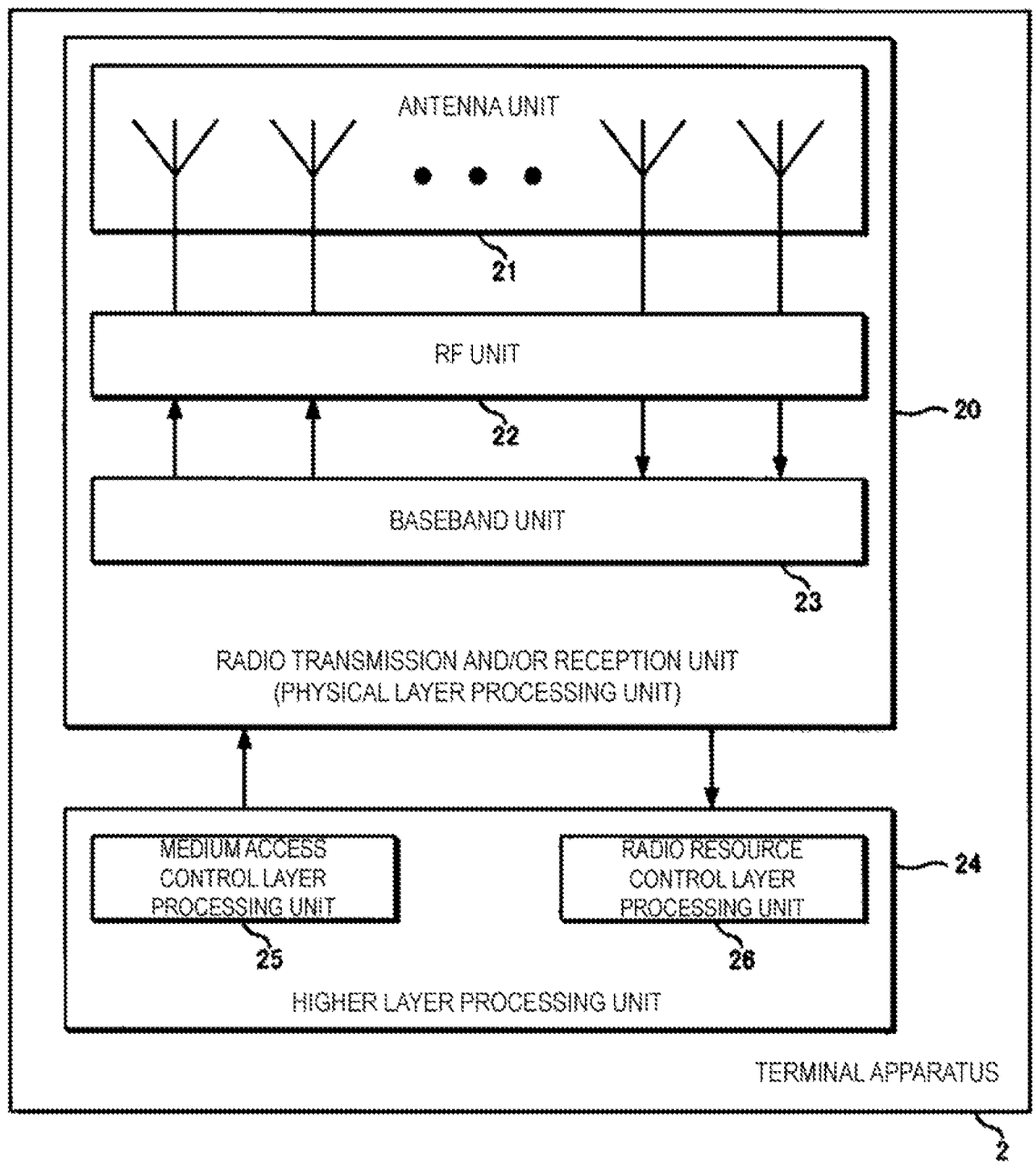
FIG. 2 is a block diagram illustrating an example of a schematic configuration of a terminal apparatus according to the embodiment of the present invention.

FIG. 2 is a schematic block diagram illustrating a configuration of the terminal apparatus 2 according to the present embodiment. As illustrated, the terminal apparatus 2 is configured to include a radio transmission and/or reception unit 20 and a higher layer processing unit 24. The radio transmission and/or reception unit 20 is configured to include an antenna unit 21, a Radio Frequency (RP) unit 22, and a baseband unit 23. The higher layer processing unit 24 is configured to include a medium access control layer processing unit 25 and a radio resource control layer processing unit 26. The radio transmission and/or reception unit 20 is also referred to as a transmission unit, a reception unit or a physical layer processing unit.

The higher layer processing unit 24 outputs uplink data (transport block) generated by a user operation or the like, to the radio transmission and/or reception unit 20. The higher layer processing unit 24 performs processing of the Medium Access Control (MAC) layer, the Packet Data Convergence Protocol (PDCP) layer, the Radio Link Control (RIX) layer, and the Radio Resource Control (RRC) layer.

The medium access control layer processing unit 25 included in the higher layer processing unit 24 performs processing of the Medium Access Control layer. The medium access control layer processing unit 25 controls transmission of a scheduling request, based on various types of configuration information/parameters managed by the radio resource control layer processing unit 26.

The radio resource control layer processing unit 26 included in the higher layer processing unit 24 performs processing of the radio resource control layer. The radio resource control layer processing unit 26 manages the various types of configuration information/parameters of the terminal apparatus 2. The radio resource control layer processing unit 26 sets the various types of configuration information/parameters, based on higher layer signaling received from the base station apparatus 3. That is, the radio resource control layer processing unit 26 sets the various types of configuration information/parameters, based on information indicating the various types of configuration information/parameters received from the base station apparatus 3.

The radio transmission and/or reception unit 20 performs processing of the physical layer, such as modulation, demodulation, coding, decoding and the like. The radio transmission and/or reception unit 20 demultiplexes, demodulates, and decodes a signal received from the base station apparatus 3, and outputs the information resulting from the decoding to the higher layer processing unit 24. The radio transmission and/or reception unit 20 modulates and codes data to generate a transmit signal, and transmits the transmit signal to the base station apparatus 3.

The RF unit 22 converts (down-converts) a signal received via the antenna unit 21 into a baseband signal by orthogonal demodulation and removes unnecessary frequency components. The RF unit 22 outputs the processed analog signal to the baseband unit.

The baseband unit 23 converts the analog signal input from the RF unit 22 into a digital signal. The baseband unit 23 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 23 performs Inverse Fast Fourier Transform (IFET) on data, generates an SC-FDMA symbol, attaches a CP to the generated SC-TDMA symbol, generates a baseband digital signal, and converts the baseband digital signal into an analog signal. The baseband unit 23 outputs the analog signal resulting from the conversion, to the RF unit 22.

The RF unit 22 removes unnecessary frequency components from the analog signal input from the baseband unit 23 by using a low-pass filter, up-converts the analog signal into a signal of a carrier frequency, and transmits the final result via the antenna unit 21. Furthermore, the RF unit 22 amplifies power. Furthermore, the RF unit 22 may have a function of controlling transmit power. The RF unit 22 is also referred to as a transmit power control unit.

Note that the terminal apparatus 2 may have a configuration including some or all of the respective units in order to support multiple frequencies (frequency bands, frequency band widths) by carrier aggregation, or transmission and/or reception processing in the same subframe of a cell.

Figure 3:
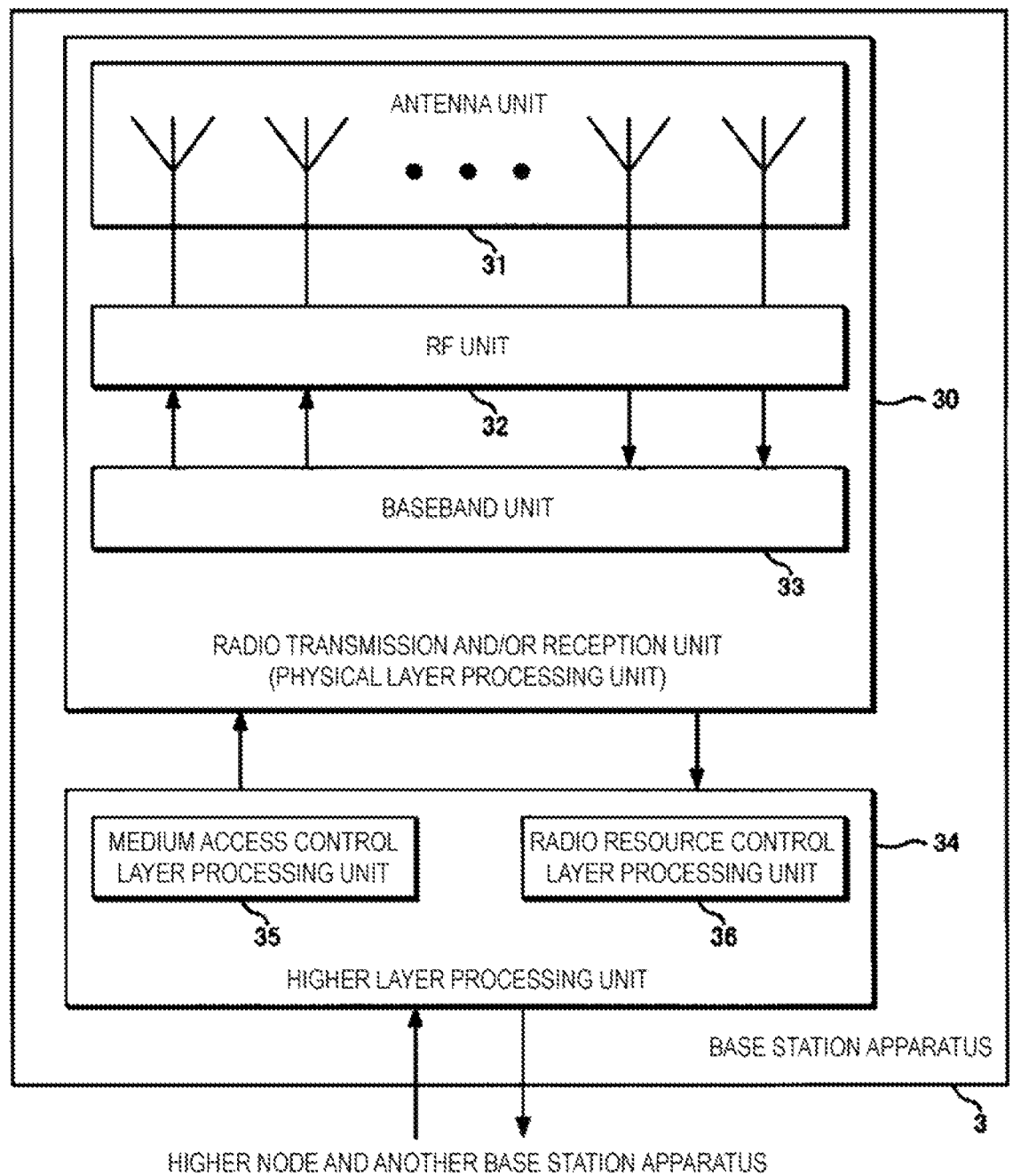
FIG. 3 is a block diagram illustrating an example of a schematic configuration of a base station apparatus according to the embodiment of the present invention.

FIG. 3 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmission unit, a reception unit or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the medium access control layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the radio resource control layer. The radio resource control layer processing unit 36 generates, or acquires from a higher node, downlink data (transport block) arranged on a physical downlink shared channel, system information, an RRC message, a MAC Control Element. (CE), and the like, and outputs the generated or acquired data to the radio transmission and/or reception unit 30. Furthermore, the radio resource control layer processing unit 36 manages the various types of configuration information/ parameters for each of the terminal apparatuses 2. The radio resource control layer processing unit 36 may set the various types of configuration information/parameters for each of the terminal apparatuses 2 via the higher layer signaling. In other words, the radio resource control layer processing unit 36 transmits/broadcasts information indicating the various types of configuration information/parameters.

The functionality of the radio transmission and/or reception unit 30 is similar to that of the radio transmission and/or reception unit 20, and hence description thereof is omitted.

The higher layer processing unit 34 transmits (transfers) or receives control messages or user data between the base station apparatuses 3 or between a higher-node network device (MME or Serving-GW (S-GW)) and the base station apparatus 3. Although, in FIG. 3, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a radio resource management layer processing unit or an application layer processing unit exists in the higher order of the radio resource control layer processing unit 36.

Note that "Units" in the drawing refer to constituent elements to provide the functions and the procedures of the terminal apparatus 2 and the base station apparatus 3, which are also represented by the terms such as a section, a circuit, a constituting device, a device, a unit, and the like.

Each of the units having the reference signs 10 to 16 included in the terminal apparatus 2 may be configured as a circuit. Each of the units having the reference signs 30 to 36 included in the base station apparatus 3 may be configured as a circuit.

Various aspects of the terminal apparatus 2 and the base station apparatus 3 according to the embodiment of the present invention will be described below.

The present invention provides a terminal apparatus capable of efficiently monitoring a status of communication with a base station apparatus, a base station apparatus communicating with the terminal apparatus, a communication method to be used for the terminal apparatus, a communication method to be used for the base station apparatus, an integrated circuit to be mounted on the terminal apparatus, and an integrated circuit to be mounted on the base station apparatus.

(1) A first aspect of the present invention is a terminal apparatus for communicating with a base station apparatus via a cell, the terminal apparatus communicating with the base station apparatus by switching between a first frequency and a second frequency different from the first frequency in the cell, in which a timer for monitoring a radio link in the cell is common between the first frequency and the second frequency, the timer starts based on consecutively detecting that out of synchronization (out-of-sync) occurs a prescribed number of times, the timer stops in the case of switching between the first frequency and the second frequency, and any one of the first frequency and the second frequency is a frequency by which the terminal apparatus has established Radio Resource Control (RRC) connection.

(2) In the first aspect of the present invention, in a case that first out of synchronization is detected on the first frequency and second out of synchronization is detected on the second frequency, even in a case that the first out of synchronization and the second out of synchronization consecutively occur, it is regarded that the first out of synchronization and the second out of synchronization do not consecutively occur.

(3) In the first aspect of the present invention, the timer stops based on consecutively detecting in-synchronization (in-sync) a prescribed number of times, and in a case that first in-synchronization is detected on the first frequency and second in-synchronization is detected on the second frequency, even in a case that the first in-synchronization and the second in-synchronization are consecutively detected, it is regarded that the first in-synchronization and the second in-synchronization are not consecutively detected.

(4) In the first aspect of the present invention, it is regarded that the first out of synchronization detected on the first frequency and the second out of synchronization detected on the second frequency consecutively occur.

(5) In the first aspect of the present invention, the timer stops based on consecutively detecting the in-synchronization (in-sync) the prescribed number of times, and it is regarded that the first in-synchronization detected on the first frequency and the second in-synchronization detected on the second frequency are consecutively detected.

(6) A second aspect of the present invention is a terminal apparatus for communicating with a base station apparatus via a cell, the terminal apparatus communicating with the base station apparatus by switching between a third frequency and a fourth frequency different from the third frequency in the cell, in which, in a case of monitoring a radio link in the cell, detection for out of synchronization (out-of-sync) is performed only by any one of the third frequency and the fourth frequency, and any one of the third frequency and the fourth frequency is a frequency by which the terminal apparatus has established Radio Resource Control (RRC) connection.

(7) In the second aspect of the present invention, a timer for monitoring the radio link in the cell starts based on consecutively detecting that the out of synchronization occurs a prescribed number of times on the third frequency, and the timer stops in a case of switching from the third frequency to the fourth frequency.

(8) In the second aspect of the present invention, the timer for monitoring the radio link in the cell starts based on consecutively detecting that the out of synchronization occurs the prescribed number of times on the third frequency, the timer suspends detection for the out of synchronization in a case of switching from the third frequency to the fourth frequency, and the timer suspends detection for the out of synchronization in a case of switching from the third frequency to the fourth frequency and resumes the detection for the out of synchronization in a case of returning from the fourth frequency to the third frequency.

(9) In the second aspect of the present invention, it is regarded that the out of synchronization detected immediately before the suspension and out of synchronization detected immediately after the resumption are consecutively detected.

(10) A third aspect of the present invention is a communication method to be applied to a terminal apparatus for communicating with a base station apparatus via a cell, the communication method including at least a step of communicating with the base station apparatus by switching between a first frequency and a second frequency different from the first frequency in the cell, in which a timer for monitoring a radio link in the cell is common between the first frequency and the second frequency, the timer starts based on consecutively detecting that out of synchronization (out-of-sync) occurs a prescribed number of times, the timer stops in the case of switching between the first frequency and the second frequency, and any one of the first frequency and the second frequency is a frequency by which the terminal apparatus has established Radio Resource Control (RRC) connection.

(11) A fourth aspect of the present invention is an integrated circuit to be mounted on a terminal apparatus for communicating with a base station apparatus via a cell, the integrated circuit allowing the terminal apparatus to perform a function of communicating with the base station apparatus by switching between a first frequency by which the terminal apparatus establishes Radio Resource Control (RRC) connection and a second frequency different from the first frequency in the cell, in which a timer for monitoring a radio link in the cell is common between the first frequency and the second frequency, the timer starts based on consecutively detecting that out of synchronization (out-of-sync) occurs a prescribed number of times, the timer stops in the case of switching between the first frequency and the second frequency, and any one of the first frequency and the second frequency is a frequency by which the terminal apparatus has established the Radio Resource Control (RRC) connection.

(12) A fifth aspect of the present invention is a communication method to be applied to a terminal apparatus for communicating with a base station apparatus via a cell, the communication method including at least a step of communicating with the base station apparatus by switching between a third frequency and a fourth frequency different from the third frequency in the cell, in which, in a case of monitoring a radio link in the cell, detection for out of synchronization (out-of-sync) is performed only by any one of the third frequency and the fourth frequency, and any one of the third frequency and the fourth frequency is a frequency by which the terminal apparatus has established Radio Resource Control (RRC) connection.

(13) A sixth aspect of the present invention is an integrated circuit to be mounted on a terminal apparatus for communicating with a base station apparatus via a cell, the integrated circuit allowing the terminal apparatus to perform a function of communicating with the base station apparatus by switching between a third frequency and a fourth frequency different from the third frequency in the cell, in which, in a case of monitoring a radio link in the cell, detection for out of synchronization (out-of-sync) is performed only by any one of the third frequency and the fourth frequency, and any one of the third frequency and the fourth frequency is a frequency by which the terminal apparatus has established Radio Resource Control (RRC) connection.

With this configuration, the terminal apparatus 2 is capable of efficiently monitoring a state of communication with the base station apparatus 3.

Note that the embodiment discussed thus far is merely an example, and the embodiment can be implemented using various kinds of modifications, replacement, or the like. For example, an uplink transmission scheme can be applied to both communication systems of a Frequency Division Duplex (FDD) scheme and a Time Division Duplex (TDD) scheme. The names of the parameters, events, and the like indicated in the embodiment are given for the sake of convenience of description; therefore, even in a case that the actual applied names differ from the names in the embodiment of the present invention, the spirit of the invention claimed in the embodiment of the present invention is not affected in any way.

The term "connection" used in each embodiment is not limited to the configuration in which a certain device and another device are directly connected using a physical line, and includes a configuration in which the devices are logically connected, a configuration in which the devices are radio-connected using the radio technologies, and the like.

The terminal apparatus 2 is also referred to as a user terminal, a mobile station device, a communication terminal, a mobile device, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), and a Base Station (BS).

The base station apparatus 3 according to the present invention can also be enabled as an aggregation (a device group) constituted of multiple devices. Each of the devices constituting such a device group may include some or all portions of each function or each functional block of the base station apparatus 3 according to the above-described embodiment. The device group may include a series of general functions or functional blocks of the base station apparatus 3. Furthermore, the terminal apparatus 2 according to the above-described embodiment can also communicate with the base station apparatus 3 as an aggregate.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

A program running on a apparatus according to the present invention may serve as a program that controls a Central Processing Unit (CPU) and the like, and causes a computer to operate in such a manner as to enable the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for enabling such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to enable some of the functions described above, and additionally may be configured to enable the functions described above, in combination with a program already recorded in the computer system.

Furthermore, each functional block or various characteristics of the apparatuses used in the above-described embodiment may be mounted or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or each of the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiment. In the embodiment, apparatuses have been described as an example, but the invention of the present application is not limited to these apparatuses, and is applicable to a terminal apparatus or a communication device of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiment is also included in the technical scope of the present invention.

REFERENCE SIGNS LIST 2 (2A, 2B, 2C) Terminal apparatus
3 (3A, 3B) Base station apparatus
20, 30 Radio transmission and/or reception unit
21, 31 Antenna unit
22, 32 RF unit
23, 33 Baseband unit
24, 34 Higher layer processing unit
25, 35 Medium access control layer processing unit
26, 36 Radio resource control layer processing unit

The invention claimed is:

1. A terminal apparatus for communicating with a base station apparatus via a cell,
the terminal apparatus communicating with the base station apparatus by switching between a first frequency and a second frequency different from the first frequency in the same cell,
wherein a timer for monitoring a radio link in the cell is common between the first frequency and the second frequency,
the timer starts based on consecutively detecting that out of synchronization (out-of-sync) occurs a prescribed number of times,
the timer stops in the case of switching between the first frequency and the second frequency, and
any one of the first frequency and the second frequency is a frequency by which the terminal apparatus has established Radio Resource Control (RRC) connection on the same cell.

2. The terminal apparatus according to claim 1,
wherein in a case that first out of synchronization is detected on the first frequency and second out of synchronization is detected on the second frequency, even in a case that the first out of synchronization and the second out of synchronization consecutively occur, it is regarded that the first out of synchronization and the second out of synchronization do not consecutively occur.

3. The terminal apparatus according to claim 1,
wherein the timer stops based on consecutively detecting in-synchronization (in-sync) a prescribed number of times, and in a case that first in-synchronization is detected on the first frequency and second in-synchronization is detected on the second frequency, even in a case that the first in-synchronization and the second in-synchronization are consecutively detected, it is regarded that the first in-synchronization and the second in-synchronization are not consecutively detected.

4. The terminal apparatus according to claim 1,
wherein it is regarded that the first out of synchronization detected on the first frequency and the second out of synchronization detected on the second frequency consecutively occur.

5. The terminal apparatus according to claim 1,
wherein the timer stops based on consecutively detecting in-synchronization (in-sync) a prescribed number of times, and it is regarded that first in-synchronization detected on the first frequency and second in-synchronization detected on the second frequency are consecutively detected.

6. A terminal apparatus for communicating with a base station apparatus via a cell,
the terminal apparatus communicating with the base station apparatus by switching between a third frequency and a fourth frequency different from the third frequency in the same cell,
wherein, in a case of monitoring a radio link in the cell, detection for out of synchronization (out-of-sync) is performed only by any one of the third frequency and the fourth frequency, and
any one of the third frequency and the fourth frequency is a frequency by which the terminal apparatus has established Radio Resource Control (RRC) connection on the same cell.

7. The terminal apparatus according to claim 6,
wherein a timer for monitoring a radio link in the cell starts based on consecutively detecting that the out of synchronization occurs a prescribed number of times on the third frequency, and
the timer stops in a case of switching from the third frequency to the fourth frequency.

8. The terminal apparatus according to claim 6,
wherein a timer for monitoring a radio link in the cell starts based on consecutively detecting that the out of synchronization occurs a prescribed number of times on the third frequency,
the timer suspends detection for the out of synchronization in a case of switching from the third frequency to the fourth frequency, and
the timer suspends detection for the out of synchronization in a case of switching from the third frequency to the fourth frequency and resumes the detection for the out of synchronization in a case of returning from the fourth frequency to the third frequency.

9. The terminal apparatus according to claim 8,
wherein it is regarded that the out of synchronization detected immediately before the suspension and out of synchronization detected immediately after the resumption are consecutively detected.

10. A communication method to be applied to a terminal apparatus for communicating with a base station apparatus via a cell, the method comprising at least the step of:
communicating with the base station apparatus by switching between a first frequency and a second frequency different from the first frequency in the same cell,
wherein a timer for monitoring a radio link in the cell is common between the first frequency and the second frequency,
the timer starts based on consecutively detecting that out of synchronization (out-of-sync) occurs a prescribed number of times,
the timer stops in the case of switching between the first frequency and the second frequency, and
any one of the first frequency and the second frequency is a frequency by which the terminal apparatus has established Radio Resource Control (RRC) connection on the same cell.

11. An integrated circuit to be mounted on a terminal apparatus for communicating with a base station apparatus via a cell,
the integrated circuit allowing the terminal apparatus to perform a function of communicating with the base station apparatus by switching between a first frequency and a second frequency different from the first frequency in the same cell,
wherein a timer for monitoring a radio link in the cell is common between the first frequency and the second frequency,
the timer starts based on consecutively detecting that out of synchronization (out-of-sync) occurs a prescribed number of times,
the timer stops in the case of switching between the first frequency and the second frequency, and
any one of the first frequency and the second frequency is a frequency by which the terminal apparatus has established Radio Resource Control (RRC) connection on the same cell.

12. A communication method to be applied to a terminal apparatus for communicating with a base station apparatus via a cell, the method comprising at least the step of:
communicating with the base station apparatus by switching between a third frequency and a fourth frequency different from the third frequency in the same cell,
wherein, in a case of monitoring a radio link in the cell, detection for out of synchronization (out-of-sync) is performed only by any one of the third frequency and the fourth frequency, and
any one of the third frequency and the fourth frequency is a frequency by which the terminal apparatus has established Radio Resource Control (RRC) connection on the same cell.

13. An integrated circuit to be mounted on a terminal apparatus for communicating with a base station apparatus via a cell,
the integrated circuit allowing the terminal apparatus to perform a function of communicating with the base station apparatus by switching between a third frequency and a fourth frequency different from the third frequency in the same cell,
wherein, in a case of monitoring a radio link in the cell, detection for out of synchronization (out-of-sync) is performed only by any one of the third frequency and the fourth frequency, and
any one of the third frequency and the fourth frequency is a frequency by which the terminal apparatus has established Radio Resource Control (RRC) connection on the same cell.

\* \* \* \* \*